(12) United States Patent
Powell et al.

(10) Patent No.: US 7,811,529 B2
(45) Date of Patent: Oct. 12, 2010

(54) HYDROGEN GENERATION APPARATUS AND METHOD FOR USING SAME

(75) Inventors: Michael Powell, Kennewick, WA (US); Charles J. Call, Albuquerque, NM (US)

(73) Assignee: Intelligent Energy, Inc., Long Beach, CA (US)

( * ) Notice: Subject to any disclaimer, the term of this patent is extended or adjusted under 35 U.S.C. 154(b) by 1889 days.

(21) Appl. No.: 10/476,015

(22) PCT Filed: Apr. 23, 2002

(86) PCT No.: PCT/US02/12822

§ 371 (c)(1),
(2), (4) Date: Apr. 27, 2004

(87) PCT Pub. No.: WO02/086987

PCT Pub. Date: Oct. 31, 2002

(65) Prior Publication Data

US 2005/0172556 A1    Aug. 11, 2005

Related U.S. Application Data

(60) Provisional application No. 60/286,114, filed on Apr. 23, 2001.

(51) Int. Cl.
*B01J 7/02* (2006.01)
(52) U.S. Cl. .................. 422/236; 422/187; 423/648.1
(58) Field of Classification Search .......... 422/187, 422/236; 423/648.1
See application file for complete search history.

(56) References Cited

U.S. PATENT DOCUMENTS

| | | | |
|---|---|---|---|
| 3,480,419 A | * | 11/1969 | Alliot et al. .................. 48/212 |
| 3,505,027 A | | 4/1970 | Breitbach et al. |
| 3,907,511 A | * | 9/1975 | Forbes et al. .................. 422/191 |
| 4,624,841 A | * | 11/1986 | Hidaki .................. 423/359 |
| 4,761,164 A | | 8/1988 | Pez et al. |

(Continued)

FOREIGN PATENT DOCUMENTS

DE     19902926 A1    3/2000

(Continued)

OTHER PUBLICATIONS

International Search Report of Jan. 2, 2003.

*Primary Examiner*—Steven Bos
*Assistant Examiner*—Paul A Wartalowicz
(74) *Attorney, Agent, or Firm*—Luce, Forward, Hamilton & Scripps, LLP; Mark Krietzman

(57) ABSTRACT

A compact hydrogen generator for use with fuel cells and other applications includes a hydrogen membrane reactor having a combustion chamber and a reaction chamber. The two chambers are have a fluid connection and a heat exchange relationship with one another. The hydrogen generation apparatus also includes a fuel supply, a fuel supply line for transporting fuel from the fuel supply to the reaction chamber, an oxygen supply, an oxygen supply line for transporting oxygen form the oxygen supply to the combustion chamber, as well as a tail gas supply line for transporting tail gas supply line for transporting tail gases form the reaction chamber, a combustion by-product line for transporting combustion by-products for the combustion chamber, and a reaction product line for transporting hydrogen from the reaction chamber.

25 Claims, 12 Drawing Sheets

U.S. PATENT DOCUMENTS

| | | | |
|---|---|---|---|
| 4,781,214 A | 11/1988 | Scaramucci | |
| 4,781,241 A | 11/1988 | Misage et al. | |
| 5,222,551 A | 6/1993 | Hasegawa et al. | |
| 5,360,461 A | 11/1994 | Meinzer | |
| 5,389,230 A * | 2/1995 | Veluswamy | 208/68 |
| 5,432,023 A * | 7/1995 | Yamada et al. | 429/34 |
| 5,652,020 A | 7/1997 | Collins et al. | |
| 5,676,911 A | 10/1997 | Baumert et al. | |
| 5,741,474 A | 4/1998 | Isomura | |
| 5,897,970 A | 4/1999 | Isomura | |
| 5,938,800 A * | 8/1999 | Verrill et al. | 48/127.9 |
| 6,007,699 A * | 12/1999 | Cole | 208/134 |
| 6,122,909 A | 9/2000 | Murphy et al. | |
| 6,231,831 B1 * | 5/2001 | Autenrieth et al. | 423/648.1 |
| 6,269,625 B1 | 8/2001 | Dibble et al. | |
| 6,280,864 B1 | 8/2001 | Towler et al. | |
| 6,331,281 B1 | 12/2001 | Teru et al. | |
| 6,350,297 B1 | 2/2002 | Doyle et al. | |
| 6,368,735 B1 | 4/2002 | Lomax et al. | |
| 6,413,479 B1 | 7/2002 | Kudo et al. | |
| 6,470,569 B1 | 10/2002 | Lippert et al. | |
| 6,488,900 B1 * | 12/2002 | Call et al. | 422/173 |
| 6,503,298 B1 | 1/2003 | Monzyk et al. | |
| 6,627,338 B2 | 9/2003 | St-Pierre et al. | |
| 6,653,005 B1 | 11/2003 | Muradov | |
| 6,869,707 B2 | 3/2005 | Edlund et al. | |
| 7,048,897 B1 | 5/2006 | Koripella et al. | |
| 7,056,369 B2 | 6/2006 | Beisswenger et al. | |
| 7,077,643 B2 | 7/2006 | Holladay et al. | |
| 2001/0000380 A1 | 4/2001 | Buxbaum | |
| 2001/0021359 A1 * | 9/2001 | Johnston | 422/198 |
| 2002/0025458 A1 | 2/2002 | Faville et al. | |
| 2002/0028171 A1 | 3/2002 | Goetsch et al. | |
| 2002/0127445 A1 | 9/2002 | Carpenter et al. | |
| 2002/0146604 A1 | 10/2002 | Matoba | |
| 2003/0068269 A1 | 4/2003 | Matzakos et al. | |
| 2003/0191199 A1 | 10/2003 | O'Rear | |
| 2003/0232224 A1 | 12/2003 | Kordesch et al. | |
| 2004/0154223 A1 | 8/2004 | Powell et al. | |
| 2004/0187386 A1 | 9/2004 | Wangerow et al. | |
| 2004/0191137 A1 | 9/2004 | Chellappa | |
| 2004/0194626 A1 | 10/2004 | Chellappa et al. | |
| 2004/0219423 A1 | 11/2004 | Tunney et al. | |
| 2005/0016729 A1 | 1/2005 | Savage | |
| 2005/0022448 A1 | 2/2005 | Kaye | |
| 2005/0039400 A1 | 2/2005 | Lau et al. | |
| 2005/0042165 A1 | 2/2005 | Akiyama et al. | |
| 2005/0244684 A1 | 11/2005 | Koripella | |

FOREIGN PATENT DOCUMENTS

| | | |
|---|---|---|
| EP | 1208904 A | 5/2002 |
| JP | 05078810 A | 3/1993 |
| WO | WO 99/64146 | 12/1999 |
| WO | WO 00/78434 A | 12/2000 |
| WO | WO 02/071451 A2 | 9/2002 |
| WO | WO 02/086987 A2 | 10/2002 |
| WO | WO 03/035547 A1 | 5/2003 |
| WO | WO 03/055585 | 7/2003 |

* cited by examiner

HYDROGEN GENERATION APPARATUS AND METHOD FOR USING SAME

CROSS-REFERENCE TO RELATED APPLICATIONS

This application is a U.S. National Phase Application of International Application Number PCT/US02/12822, filed Apr. 23, 2002, entitled "Hydrogen generation apparatus and method for using same" by Applicant Mesosystems Technology Inc*-., now expired, which claims the benefit of the prior filing date of U.S. Provisional Patent Application No. 60,286,114, filed Apr. 23, 2001, now expired, the disclosures of which are incorporated herein by reference in their entirety.

STATEMENT REGARDING FEDERALLY-SPONSORED RESEARCH OR DEVELOPMENT

This invention was made under contract with the United States Army Research Office, under Contract No. DAAD19-01-C-0015, and the United States Government may have certain rights in the invention.

BACKGROUND OF THE INVENTION

1. Field of the Invention

The present invention generally relates to the chemical arts. More particularly, the present invention relates to an apparatus and method for generating hydrogen gas by decomposing or reforming a liquid fuel.

2. General Background and State of the Art

The growing popularity of portable electronic devices has produced an increased demand for compact and correspondingly portable electrical power sources to energize these devices. Developments in robotics and other emerging technology applications are further increasing the demand for small, independent power sources.

At present, storage or rechargeable batteries are typically used to provide independent electrical power sources for portable devices. However, the amount of energy that can be stored in storage or rechargeable batteries is insufficient to meet the need of certain applications.

Hydrogen/air fuel cells (H/AFCs) have enormous potential as a replacement for batteries. Because they can operate on very energy-dense fuels, fuel cell-based power supplies offer high energy-to-weight ratios compared with even state-of-the-art batteries. Fuel cells are of particular interest to the military, where significant efforts are being made to reduce the weight of power supplies that soldiers must carry to support high-tech, field-portable equipment. There is also considerable potential for utilizing fuel cell-based power supplies for commercial applications, particularly where small size and low weight are desirable.

A common H/AFC is a polymer electrolyte membrane (PEM) fuel cell. PEM fuel cells are constructed of an anode and a cathode separated by a polymer electrolyte membrane.

Functionally, fuel cells generate electricity by reacting hydrogen with oxygen to produce water. Since oxygen can typically be obtained from the ambient atmosphere, only a source of hydrogen must be provided to operate a fuel cell. Merely providing compressed hydrogen is not always a viable option, because of the substantial volume that even a highly compressed gas occupies. Liquid hydrogen, which occupies less volume, is a cryogenic liquid, and a significant amount of energy is required to maintain the extremely low temperatures required to maintain it as a liquid. Furthermore, there are safety issues involved with the handling and storage of hydrogen in the compressed gas form or in the liquid form.

Several alternative approaches are available. These alternatives include ammonia decomposition and hydrocarbon reformation. Ammonia decomposition is relatively easy. Ammonia can be thermo-catalytically cracked at relatively low temperatures to produce a gas mixture that is 75% hydrogen by volume. Hydrocarbon fuels are somewhat more technically challenging, because hydrocarbon reformation requires relatively higher temperatures, and the simple cracking of hydrocarbons produces a solid residue which is undesirable in a fuel cell application. However, the reformation of hydrocarbon fuels offers the incentive of enabling a higher energy density fuel to be used, as compared with the use of ammonia as a fuel source, i.e., the production of a greater mass of hydrogen per unit mass of fuel. Consequently, there is a desideratum for an apparatus that has the flexibility to effectively and efficiently generate hydrogen from either ammonia or hydrocarbon fuel.

The ammonia decomposition reaction can be represented as follows:

$$2NH_3 \rightarrow N_2 + 2H_2 \tag{1}$$

The simple hydrocarbon cracking reaction can be represented as follows:

$$C_nH(2_n+2) \rightarrow C_{n(solid)} + (n+1)H_2 \tag{2}$$

The formation of solid residues can be avoided through the use of oxidative cracking processes or by employing steam reforming. Oxidative cracking be represented as follows:

$$C_nH(2_n+2)_nO_2 \rightarrow _nCO_2 + (n+1)H_2 \tag{3}$$

Steam reforming can be represented as follows:

$$C_nH(2_n+2)2_nH_2O \rightarrow _nCO_2 + (3_n+1)H_2 \tag{4}$$

It is a drawback of ammonia decomposition that traces of un-reacted ammonia (typically <2000 ppm) remain in the product gas stream. One of the challenges of utilizing ammonia to produce hydrogen for a fuel cell is that H/AFCs do not tolerate ammonia in the hydrogen feed gas, so the trace amounts of ammonia in the hydrogen produced by an ammonia cracker must be removed before the remaining $H_2/N_2$ mixture is supplied to a fuel cell.

It is a drawback of hydrocarbon reformulation that the actual product is a mixed gas stream that contains substantial amounts of carbon monoxide (CO). Furthermore, the product is a gas stream that also contains partially oxidized hydrocarbons. Both carbon dioxide and partially oxidized hydrocarbons can poison the anode electro-catalysts used in PEM fuel cells. Thus, utilizing either ammonia decomposition, oxidative cracking or steam reforming requires additional steps to purify the hydrogen, or decompose the impurities. Such additional processes add size, cost, and complexity to a hydrogen generation system, making achieving a compact, low cost, and portable system more difficult. Therefore, it is also a desideratum to provide a hydrogen generation system that can be used to provide hydrogen to a fuel cell, which requires minimal or no additional processing to purify the hydrogen that is produced before such hydrogen can be used in a fuel cell.

To compete with battery-based power supplies, such an H/AFC apparatus needs to be compact and reliable. It is a further desideratum to develop a portable hydrogen supply with a volume less than 1 liter and a mass less than 1 kg that can produces up to 50 watts of electrical power, with a total energy output of 1 kWh. Commercially available metal hydride storage cylinders are available in 920 gm cylinders that contain the equivalent of 100 W-h of hydrogen; thus, a total energy output of 1 kWh represents an order of magnitude increase in energy density over commercially available apparatuses.

SUMMARY OF THE INVENTION

Now in accordance with this invention there has been found a compact hydrogen generation apparatus for use with fuel cells and other applications. The hydrogen generator includes a hydrogen membrane reactor having a combustion chamber and a reaction chamber. The two chambers are have a fluid connection and a heat exchange relationship with one another. The hydrogen membrane reactor also includes a fuel inlet into the reaction zone, an oxygen inlet into the combustion chamber, a tail gas outlet out of the reaction zone, a hydrogen outlet out of the hydrogen exhaust zone, and a by-product outlet out of the combustion chamber.

The hydrogen generation apparatus also includes a fuel supply, a fuel supply line for transporting fuel from the fuel supply to the reaction chamber, an oxygen supply, an oxygen supply line for transporting oxygen from the oxygen supply to the combustion chamber, as well as a tail gas supply line for transporting tail gases from the reaction chamber, a combustion byproduct line for transporting combustion by-products from the combustion chamber, arid a reaction product line for transporting hydrogen from the reaction chamber.

In some embodiments, the hydrogen membrane reactor is formed of a top plate, a bottom plate, and a separation plate having first and second opposing surfaces. The top plate and the first surface of the separation plate together define the reaction chamber, while the bottom plate and the second surface of the separation plate together define the combustion chamber. A hydrogen separation membrane having first and second opposing surfaces is disposed between the top plate and the separation plate, so that the top plate and the first surface of the hydrogen separation membrane together define a hydrogen exhaust zone, while the separation plate and the second surface of the hydrogen separation membrane together defining a reaction zone. In these embodiments, the fuel supply line transports fuel to the reaction zone, the tail gas supply line transports tail gas from the reaction zone, and the reaction product line transports hydrogen from the hydrogen exhaust zone.

And in some embodiments, the combustion chamber has a plurality of combustion channels extending radially from the surface of the separation plate and forming a fluid path through the combustion chamber, the hydrogen exhaust zone has a plurality of hydrogen exhaust channels extending radially from the first surface of the hydrogen membrane and forming a fluid path through the hydrogen exhaust zone, and the reaction zone has a plurality of reaction channels extending radially from the second surface of the hydrogen membrane and forming a fluid path through the reaction zone. The height and width of each of the combustion channels, the hydrogen exhaust channels, and the reaction channels is preferably between 0.01 mm and 10 mm and more preferably between 0.5 mm and 5 mm.

In some embodiments, the tail gas supply line makes a direct fluid connection between the reaction zone and the combustion chamber. In other embodiments, the tail gas supply line makes an indirect fluid connection between the reaction zone and the combustion chamber via the oxygen supply line.

Some embodiments additionally include a fuel heat exchanger operably connected to the fuel supply line and one of the combustion by-product line or the reaction product line. In preferred embodiments, the fuel heat exchanger is operably connected to the combustion byproduct line. Some embodiments additionally include an oxygen heat exchanger operably connected to the oxygen supply line and one of the combustion by-product line or the reaction product supply line. In preferred embodiments, the oxygen heat exchanger is operably connected to the reaction product line.

In preferred embodiments, the fuel heat exchanger and/or the oxygen heat exchanger are counterflow-type heat exchangers. In more preferred embodiments, the fuel heat exchanger and/or the oxygen heat exchanger are stacked-plate-type heat exchangers having channels with a height and a width between about 0.01 mm and 10 mm running between the stacked plates.

Some embodiments additionally include a hydrogen reservoir in fluid connection with the reaction product supply line. A hydrogen fuel cell in fluid connection with the reaction product supply line is included in some embodiments.

In some embodiments, a combustion catalyst in included the combustion chamber. The combustion catalyst and the reaction catalyst can be packed in or coated on the internal surfaces of the combustion and/or reaction channels, respectively.

In some embodiments, the fuel supply is an ammonia supply. These embodiments can additionally include an ammonia adsorbent supply in fluid communication with the reaction product line.

In other embodiments, the fuel supply is a hydrocarbon supply Suitable hydrocarbon fuel supplies include methanol, propane, butane, and kerosene fuel supplies.

Also in accordance with the invention there has been found a method for generating hydrogen. In a first step a hydrogen-producing fuel is flowed through the reaction zone and into the combustion chamber of the hydrogen membrane reactor. The reaction zone contains a reaction catalyst initially at a temperature less than the reaction catalyst's light-off temperature. In preferred embodiments, the light off temperature of the reaction catalyst is less than 6500 C. Suitable reaction catalysts include ruthenium catalysts, nickel catalysts, iron oxide catalysts, rhodium catalysts, iridium catalysts or rhenium catalysts.

The hydrogen-producing fuel is then combusted to produce combustion by-products while raising the temperature of the reaction catalyst in the reaction zone and the combustion by-products are exhausted. Combustion of the hydrogen-producing fuel is continued for a period of time sufficient to raise the temperature of the reaction catalyst to above its light off temperature.

Additional hydrogen-producing fuel is flowed into the reaction chamber and reacted to produce hydrogen and tail gases. The hydrogen is then separated from the tail gases by selectively passing the hydrogen through the hydrogen membrane.

In some embodiments, the combustion chamber contains a combustion catalyst having a light-off temperature. In preferred embodiments, the combustion catalyst also has a light off temperature of less than 650° C. Suitable combustion catalysts include platinum-rhodium catalysts.

In some embodiments, the tail gas is recirculated from the reaction zone into the combustion chamber. In some embodiments, the hydrogen-producing fuel is pre-heated prior to flowing the hydrogen producing fuel into the reaction zone. And some embodiments include flowing oxygen, preferably pre-heated oxygen into the combustion chamber.

In some embodiments, the separated hydrogen is flowed into a hydrogen reservoir. In other embodiments the separated hydrogen is flowed into a hydrogen fuel cell.

In some embodiments, the hydrogen-producing fluid is ammonia. And is some of these embodiments, the separated hydrogen is flowed through an ammonia adsorbent. In other embodiments, the hydrogen-producing fluid is a hydrocarbon. Preferred hydrocarbons include methanol, propane, butane, and kerosene.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
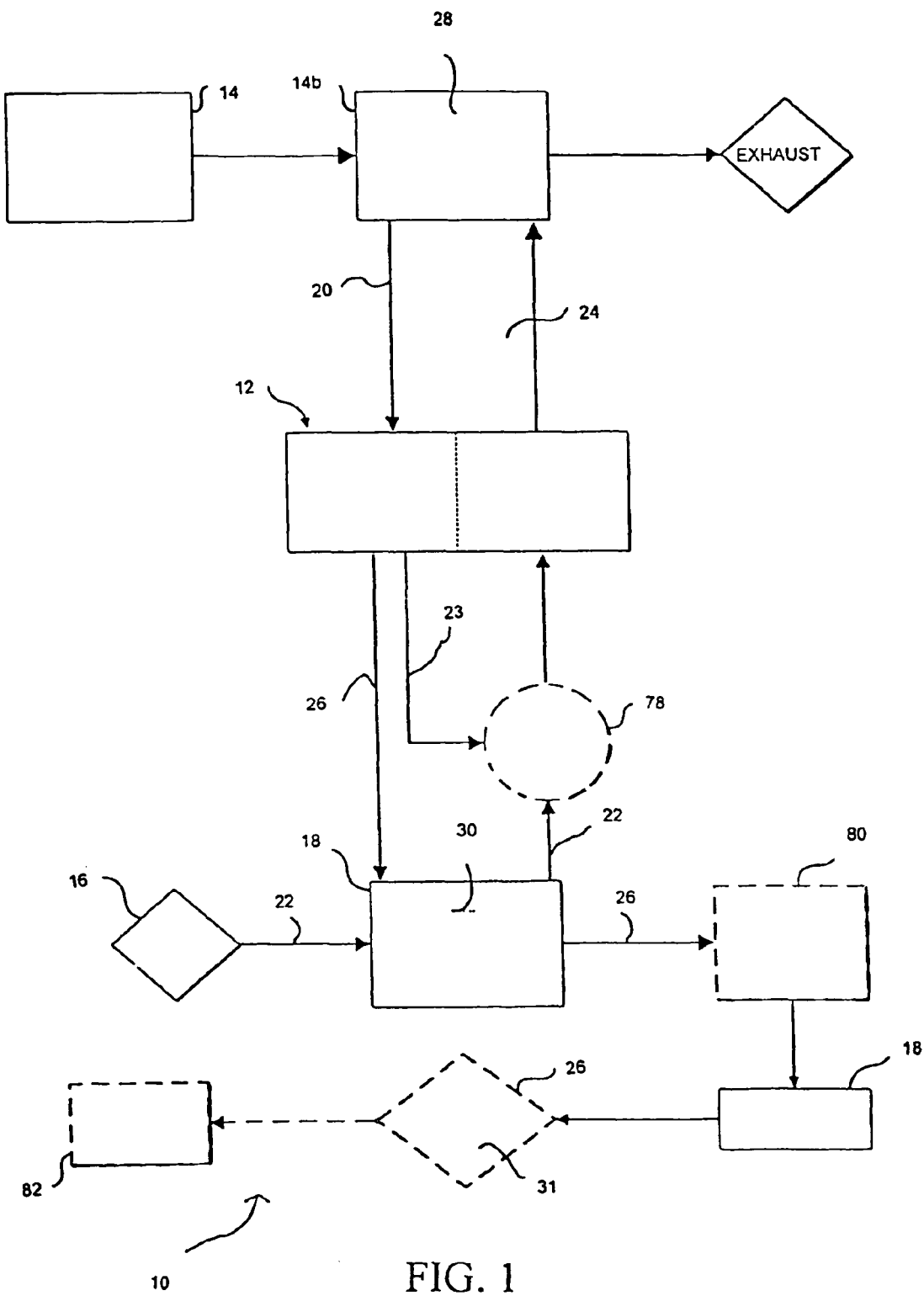
FIG. 1 is a block diagram illustrating the primary components of a hydrogen generator in accordance with the present invention.

Particular embodiments of the invention are described below in considerable detail for the purpose for illustrating its principles and operation. However, various modifications may be made, and the scope of the invention is not limited to the exemplary embodiments described.

It is an advantage of the hydrogen generators in accordance with the invention, that with only minor modifications they can be used to generate hydrogen from either ammonia or hydrocarbon fuels. Representative hydrocarbon fuels include, methanol, propane, butane, gasoline, and kerosene fuels, such as JP-8.

The fuel must be capable of both generating hydrogen and providing thermal energy. In preferred embodiments, the fuel is a liquid fuel. For example, while ammonia is a gas at standard temperature and pressure (STP) conditions, the ammonia is preferably stored in a liquid state. The ammonia is easily liquefied by compression (114 pounds per square inch) and/or by cooling to about −33° C. Similarly, while solid hydrocarbons are available, the use of a liquid hydrocarbon fuel greatly simplifies fuel transport. As with ammonia, hydrocarbons that are gaseous at STP (such as propane) are conventionally stored and transported as liquefied gases. Consequently, in preferred embodiments, the fuel is either a material that is a liquid at STP or a liquefied gas.

The hydrogen generator should preferably incorporate a relatively small, efficient hydrogen membrane reactor characterized by having excellent heat and mass transfer rates, and adapted to operate at a relatively low reaction temperature (so that conventional materials can be used for fabricating reactor components). The reactor includes two chambers, a reaction chamber, followed by a combustion chamber. The two chambers are arranged in close proximity and are in a heat exchange relationship with one another. The hydrogen membrane is in fluid communication with the hydrogen generating reaction chamber. Each chamber preferably incorporates highly active catalysts characterized by having rapid residence times and excellent heat transfer abilities with respect to the reactor (to enable a minimal volume reactor to be employed). The system further includes a pair of lightweight recuperative heat exchangers characterized as having meso-dimensioned channels and very high heat transfer rates, as well as extremely efficient insulation that minimizes reactor and heat exchanger heat loss into the environment.

A fuel supply is provided, as well as an oxygen supply, e.g., an ambient air intake, and an exhaust. The hydrogen produced can be routed to an optional PEM fuel cell, a storage tank or other hydrogen using apparatus. Hydrogen fuel generators employing ammonia as the fuel may further incorporate an ammonia adsorbent supply in fluid communication with a hydrogen reaction product line exiting the hydrogen membrane reactor to remove trace ammonia that could poison a fuel cell or have an adverse effect on the fuel cell. Hydrocarbon fueled embodiments preferably include a water storage tank, a water/fuel pump, an ambient air pump, and optionally a steam recovery vessel. By minimizing component size, a larger proportion of the system can be dedicated to the volume of fuel ammonia supplied, thereby increasing the amount of hydrogen that can be generated for each tank of ammonia fuel.

Figure 2:
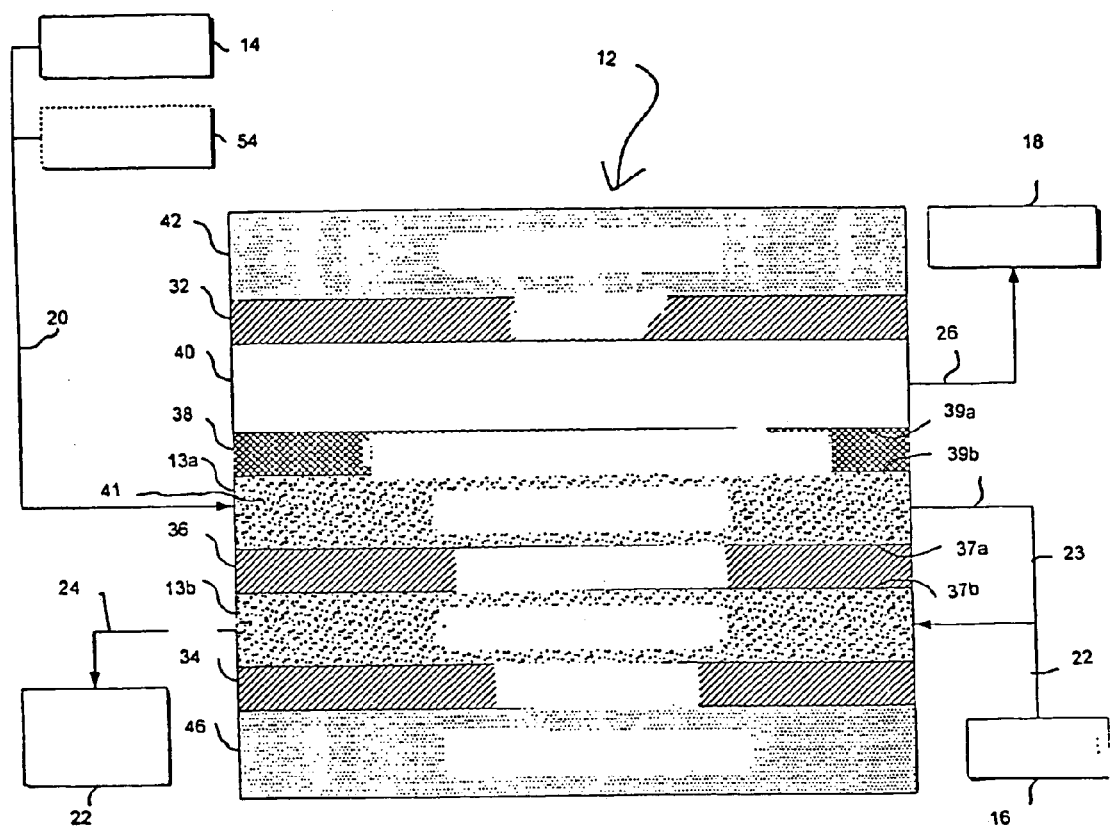
FIG. 2 is a schematic view of a hydrogen membrane reactor and related components for use in accordance with the present invention.
Figure 3:
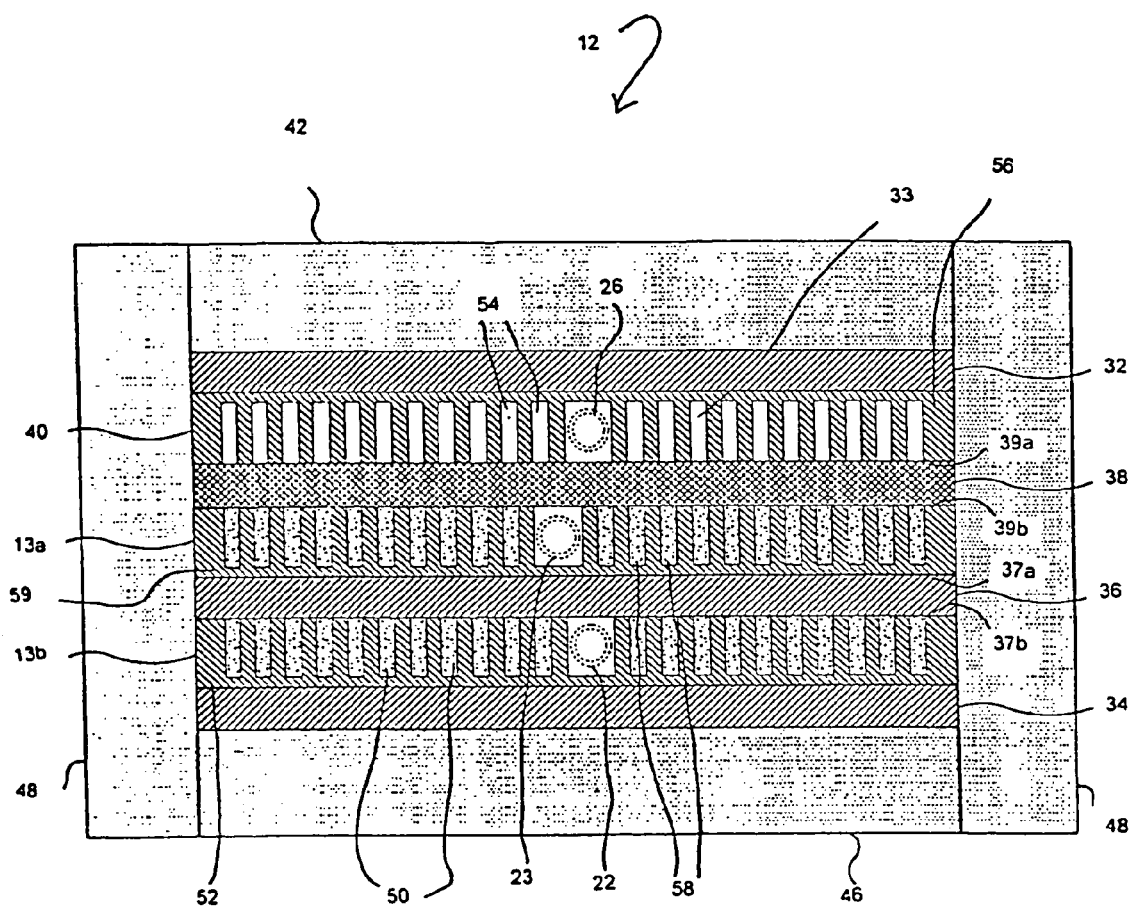
FIG. 3 is a cross-sectional view of a hydrogen membrane reactor in accordance with the present invention.
Figure 4:
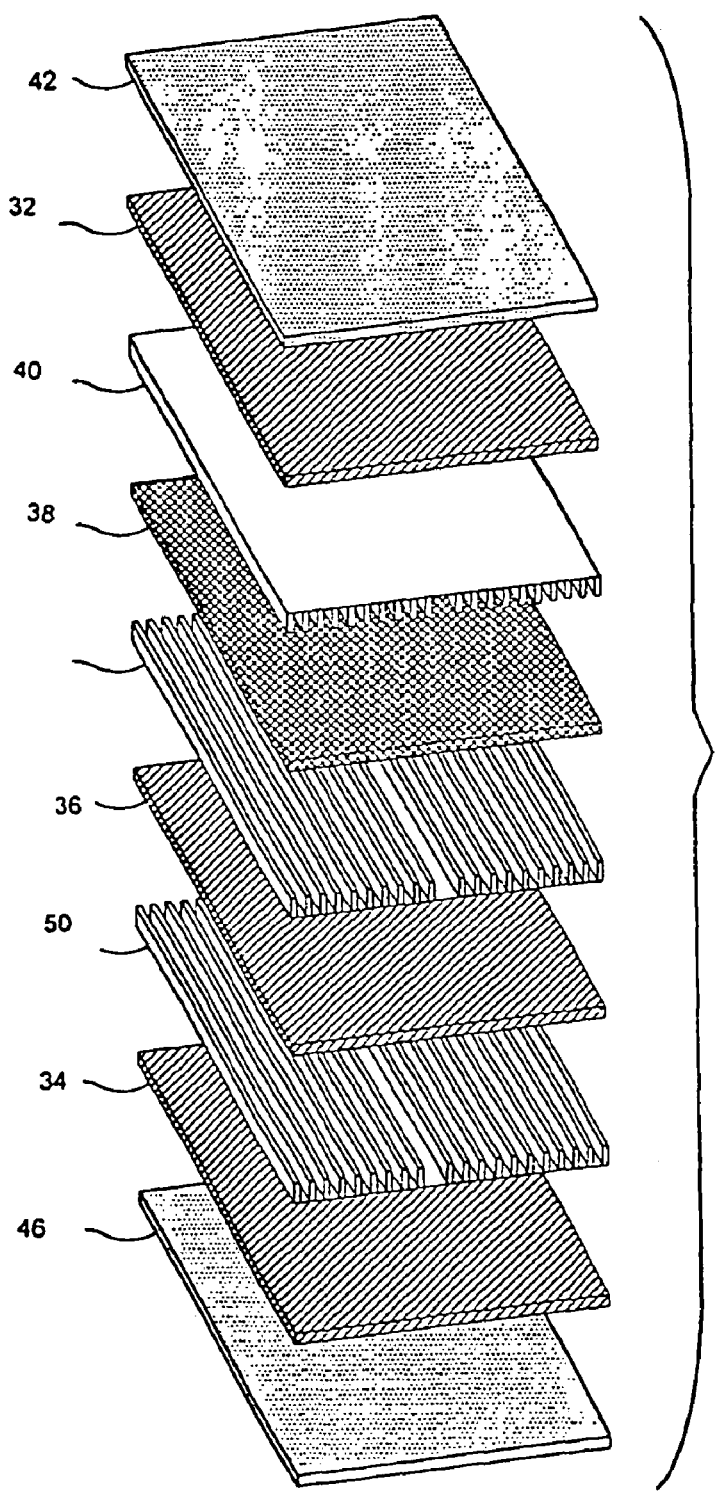
FIG. 4 is an exploded isometric view of the different layers of the hydrogen membrane reactor of FIG. 3.

An exemplary ammonia-based hydrogen generator 10 is shown in FIG. 1. The hydrogen generator includes a hydrogen membrane reactor 12 having two separate chambers, a reaction chamber 13a in a heat exchange relationship with a combustion chamber 13b (as shown in FIGS. 2-4), a fuel supply 14, an oxygen supply 16, and a hydrogen reservoir 18.

Appropriate fluid lines are included as shown, and arrowheads incorporated into such fluid lines indicate the proper flow of fluid through the hydrogen generator. The fluid lines include a fuel supply line 20 for transporting fuel from the fuel supply 14 to the reaction chamber 13a, an oxygen supply line 22 for transporting oxygen from the oxygen supply 16 to the combustion chamber 13b, a tail gas supply line 23 for transporting tail gases from the reaction chamber and directly or indirectly into the combustion chamber, a combustion byproduct line 24 for exhausting the combustion by-products from the combustion chamber, and a reaction product line 26 for transporting hydrogen from the reaction chamber to the hydrogen reservoir 18. While the tail gas supply line is shown external to the reactor, in some embodiments, the tail gas supply line is placed within an insulated region inside the reactor, so that heat loss does not occur as the tail gas is transported from the reaction chamber to combustion chamber.

In those embodiments where the fuel is a liquefied gas such as ammonia or propane, stored under pressure, no pumping system is required to the fuel through fuel supply line 20, through the fuel heat exchanger 28, and into the hydrogen membrane reactor 12. However, in embodiments where the fuel is a liquid such as JP-8 a separate pumping system (not shown) must be employed.

Especially in embodiments where a maximum energy density is desired, proper management of thermal energy is critical. Fuel in the fuel supply 14 is used both to provide the thermal energy needed to drive the hydrogen-production reaction, as well as a feedstock in the reaction. Thus, every gram of fuel used to generate thermal energy is a gram that is unavailable to be used as feedstock. If less feedstock is available, the energy density of the system is reduced. Accordingly, in some embodiments, a fuel heat exchanger 28 and an oxygen heat exchanger 30 are employed to make efficient use of the thermal energy available to the system. In some embodiments, the hydrogen membrane reactor 12, the fuel heat exchanger 28, and the oxygen heat exchanger 30, are all integrated into a single component.

While, one exemplary use of the inventive hydrogen generator is to generate hydrogen to be used in an H/AFC 31, such a system can be beneficially employed to generate hydrogen for other purposes as well. For example, the generator can be used as a source of hydrogen for welding or metal treating. Thus, the fuel cell is shown as an optional component.

In general, the physical size of each of the functional elements of a hydrogen generator in accordance with the invention depends on the desired size and capacity of the hydrogen generator. In one preferred embodiment, the hydrogen generator is less than 1 liter in volume and 1 kilogram in mass. In such an embodiment, the individual size of each element is critical in obtaining a hydrogen generator that is sufficiently compact. In other embodiments, the exact size of the system is not critical, though a compact design is typically to be preferred. In general, the size of components such as the fuel supply 14 and the hydrogen reservoir 18 will be a function of the amount of power required and a maximum desired time interval between replenishing system consumables. For example, the fuel supply must provide a sufficient quantity of fuel to ensure that performance goals for the intended period of operation are achieved.

With respect to the hydrogen membrane reactor 12, the fuel heat exchanger 28, and the oxygen heat exchanger 30, these elements are preferably as compact and light-weight as practical. Especially for embodiments in which the overall system size is of concern, minimizing the size and weight of the hydrogen membrane reactor, the fuel heat exchanger, and the air heat exchanger enables a greater proportion of system size and weight to be dedicated to fuel storage, thereby increasing the energy density and/or operating interval between refueling of the system.

It should be understood that while in at least one embodiment of the present invention, a preferred reactor will be fabricated as small and compact as feasible, hydrogen membrane reactors in accordance with the present invention can be scaled up to a larger size capable of generating significantly larger volumes of hydrogen, if desired. Similarly, such an exemplary hydrogen membrane reactor can be employed in hydrogen generating systems using large fuel supplies, to achieve a hydrogen generator that can provide modest volumes of hydrogen to a fuel cell (or other apparatus) for extended periods of time.

Some of the features of a preferred embodiment of the hydrogen membrane reactor 12 are shown in FIG. 2. The reactor includes a top plate 32, a bottom plate 34, and a separation plate 36 having first and second opposing surfaces 37a and 37b, respectively. The top plate and the first surface of separation plate together define the reaction chamber 13a, while the bottom plate and the second surface of the separation plate together define the combustion chamber 13b.

The separation plate 36 is preferably a thin metal plate having a high thermal conductivity. High thermal conductivity is critical, as heat generated within the combustion chamber must be available to provide the required temperature conditions within the hydrogen generating reaction chamber. The top plate 32 and the bottom plate 34 are structural and do not need to be thermally conductive.

Disposed between the top plate 32 and the separation plate 36 is a hydrogen separation membrane 38. The hydrogen separation membrane enables the hydrogen to be separated from the other decomposition or reformation reaction products. Such membranes allow hydrogen to diffuse across (through) the membrane, while preventing the other reaction products from crossing the membrane. Such membranes are commercially readily available.

The hydrogen separation membrane 38 has first and second opposing surfaces 39a and 39b, respectively, spanning the width of the reactor. The top plate 32 and the first surface together define a hydrogen exhaust zone 40, while the separation plate 36 and the second surface together define a reaction zone 41.

In an alternative embodiment, a hydrogen separation membrane 38 that is substantially smaller hydrogen separation membrane is employed. When ammonia is used as the fuel, contact with the pure ammonia can shorten the life of the hydrogen separation membrane 38. Therefore, in some embodiments the membrane is not placed where the ammonia first enters the hydrogen membrane reactor 12. In such embodiments, the hydrogen membrane includes a non-membrane leader portion of a suitable length to ensure that the product gas inside the reactor first contacts the membrane only after the ammonia concentration in the reactor has been reduced to ppm levels. For example, in a generator designed to provide sufficient hydrogen to generate 20 watts of power, a palladium-ceramic composite membrane with less than about 5 $cm^2$ of membrane is sufficient to efficiently separate hydrogen from synthesis gas. In this alternative embodiment, there is a single hydrogen exhaust channel in fluid communication with the relatively small membrane surface.

The top plate 32 separates the hydrogen exhaust zone 40 from an insulating panel 42, while the bottom plate 34 separates the combustion chamber 13b from an insulating panel 46. As seen in FIG. 3, in preferred embodiments, the sides of the reactor are insulated, as well, with insulating side panels 46. Preferably, the insulating panels are fabricated from an aerogel material, which can provide excellent insulation and is a very lightweight material.

FIG. 3 is a cross-sectional view of a preferred embodiment of the hydrogen membrane reactor 12. FIG. 4 is an exploded isometric view of the different layers of the hydrogen membrane reactor of FIG. 3, with the side insulative layers omitted for clarity. FIGS. 3 and 4 illustrate a plurality of combustion channels 50 extending radially from the adjacent surface 37b of the separation plate 36. The combustion channels are formed in a thin metal combustion plate or sheet 52 interposed between the bottom plate 34 and the separation plate. A plurality of hydrogen exhaust channels 54 extending radially from the first surface 39a of the hydrogen membrane 38 are formed in a thin metal hydrogen exhaust channel plate or sheet 56 interposed between the top plate 32 and the hydrogen membrane. A plurality of reaction channels 58 extending radially from the second surface 39b of the hydrogen membrane are formed in a thin metal reaction channel plate or sheet 59 interposed between the bottom plate 34 and the separation plate. In preferred embodiments, these channels are formed in the thin metal sheets, either by micromachining or stamping. It should also be understood, that the specific orientation and configuration of mesochannels in any of these elements is not critical, so long as for the orientation selected, the efficiency and processing benefits provided by mesochannels are retained (i.e., small-dimensioned fluid channels that provide excellent fluid flow and high heat transfer rates).

The dimensions of the channels 50, 54, and 58 within the hydrogen membrane reactor are preferably "meso" in scale. Meso scale systems fall between the macro scale systems associated with traditional full-sized systems, like those used in the petrochemical industry, and the micro scale systems commonly encountered in the microelectronics industry. That is, preferably the height and or width of each channel is between 0.01 mm and 10 mm, and is more preferably between 0.5 mm and 5 mm.

Regardless of which fuel is employed, thermal energy is required to drive the desired reaction. One way of reducing the thermal energy required to drive the hydrogen generating reactions is to include an appropriate reaction catalyst within the hydrogen membrane reactor 12. Thus, in preferred embodiments, the reaction zone 41 includes a reaction catalyst to facilitate the chemical transformation of fuel into hydrogen. In general, the catalysts are reaction specific, and the selection of the particular catalyst to be employed will be based, in part, on whether the selected fuel is ammonia or a liquid hydrocarbon.

Moreover, the characteristics of specific catalysts (and any required catalyst support, such as alumina) affect the design of the reactor. For example, for a given volume, different catalysts will require different flow rates to achieve the same conversion efficiency. Similarly, for a given flow rate, different catalysts will require different reactor volumes to achieve the same conversion efficiency.

Also, useful reaction catalysts function under different temperature conditions, each catalyst having a characteristic "light-off" temperature (a minimum required temperature below which little or no catalytic activity is observed), as well as a characteristic optimal temperature. These temperature parameters affect a specific reactor design by defining minimum and Optimum reactor temperatures. Thus, the catalyst selected will influence optimal temperature conditions, flow rates, and reactor volumes.

The temperature conditions, in particular, determine the type of materials that can be used in fabricating the reactor (conventional metals for temperatures less than 650° C., or refractory metals for higher temperatures). Relatively low temperature reactors (operating at less than 650° C.) and appropriate catalysts are a particularly useful and preferred combination.

Preferred reaction catalysts for ammonia disassociation at temperatures less than 650° C. include ruthenium-based catalysts, often provided as ruthenium dispersed in an aluminum oxide support matrix, such as Type 146, available from Johnson Matthey. By utilizing a reactor temperature of less than 650° C., very high surface area catalyst substrates, such as gamma alumina and nanophase titania can be employed. Temperatures in excess of 800° C. often cause these materials to sifter or undergo phase changes that result in a much lower substrate surface area and correspondingly lower catalyst activity. Preferably, the ruthenium ammonia disassociation catalyst is dispersed in either a gamma alumina or nanophase titania matrix when a packed catalyst bed is utilized.

Since oxygen is included with the ammonia to support the initial combustion, in some embodiments catalysts less oxygen sensitive than ruthenium-based catalysts are employed. Moreover, when assembling reactors containing oxygen-sensitive catalysts (i.e., by brazing the top cover to the reactor core) it may be beneficial to provide a reducing atmosphere in order to prevent the catalysts from oxidizing.

Nickel-based catalysts, such as Katalco 27-7™ (available from ICI/Katalco of the UK) are also preferred ammonia dissociation catalysts. However, the nickel catalyst requires a longer residence time than the ruthenium catalyst to achieve similar conversion efficiency. The ruthenium catalyst has a residence time that is approximately one-tenth that of the nickel catalyst.

Other suitable ammonia dissociation catalysts include iron oxide, rhodium, iridium, and rhenium catalysts.

Preferred embodiments additionally contain a combustion catalyst within the combustion chamber 13b. The combustion catalyst is employed to enable the fuel to be more readily combusted to generate the thermal energy required to drive the hydrogen generation reaction. Catalytic combustion is a unique chemical reaction differing from open flame combustion, in that a catalyst is used to ensure an efficient combustion process occurs at a lower temperature.

In particular, without such a combustion catalyst, ammonia is difficult to ignite and sustain combustion in air. For this reason, a combustion catalyst is required to enable ambient air to be employed when ammonia is used as the fuel. Preferred ammonia combustion catalysts include platinum-rhodium alloys. Similarly, by introducing platinum into a hydrocarbon/oxygen combustion process, it is possible to increase the percentage of fuel burned from less than 85% to about 98%.

The catalysts can be incorporated by any suitable method. For example, the catalysts included in reaction channels 58 and combustion channels 50 can either be incorporated as packed beds in each channel, or as a thin layer or coating deposited on the internal surfaces of the thin metal sheet comprising the channels.

Any suitable means can be employed to trigger the combustion reaction. In a preferred embodiment, a glow plug (not shown) is used. The glow plug is essentially a nichrome or other metallic element that is in contact with the combustion catalyst in the combustion chamber of the hydrogen membrane reactor 12. A small battery (not shown) delivers current to the wire, which increases the temperature of the combustion catalyst to a "light-off" temperature, i.e., to that temperature at which the ammonia combustion catalyst will facilitate the combustion of ammonia. In an alternative embodiment, a spark-based igniter is used. While the spark-based igniter offers the advantage of not requiring a battery, the air/fuel mixture must be much more tightly controlled to enable spark-based ignition to occur. Once the combustion is initiated, the process is self sustaining as long as there is sufficient fuel and oxygen, and as long as the temperature remains above 650° C.

The fuel heat exchanger 26 is disposed in the fuel supply line 20 and in the combustion by-products supply line 24 to provide a thermal connection between the fuel and the combustion by-products. The oxygen heat exchanger 28 is disposed in the oxygen supply line 22 and the reaction products line 25 to provide a thermal connection between the oxygen and the reaction products. The fuel heat exchanger extracts heat from the hot reaction product gases exiting hydrogen membrane reactor and preheats the fuel entering the reactor. Similarly, the oxygen heat exchanger extracts heat from the hot reaction product gases exiting hydrogen membrane reactor and preheats the oxygen entering the reactor.

In an alternative embodiment, the fuel heat exchanger 26 is disposed in the reaction product supply line 25 to provide a thermal connection between the fuel and the reaction products, while the oxygen heat exchanger 28 is disposed in the combustion by-products line 24 to provide a thermal connection between the oxygen and the combustion by-products. With both embodiments, the materials entering the hydrogen membrane reactor 12 are preheated to temperatures approaching the operating temperature of the reactor, so that additional fuel is not consumed to heat the reactants.

Because the vaporization process is an endothermic process (energy is consumed in the process), the liquid, or liquefied gaseous, fuel exiting the fuel tank 14 advantageously vaporizes in the fuel heat exchanger 26. For example, in returning to the gaseous state, liquefied ammonia (or other liquid fuel) absorbs substantial amounts of heat from its surroundings (i.e. one gram of ammonia absorbs 327 calories of heat). Therefore, when the vaporization occurs in heat exchanger 14, it obviates the need for additional fuel to be consumed in the reactor to generate the thermal energy that would otherwise have been necessary to drive the vaporization process. Thus, what would otherwise be waste heat is employed to vaporize the liquefied ammonia (or other fuel).

The fuel and oxygen heat exchangers 26 and 28 are preferably counterflow-type heat exchangers. In some embodiments, the heat exchanges are tube-in-tube type devices. In other embodiments, the heat exchangers are stacked plate-type heat exchangers. In those embodiments where the heat exchanger is a stacked plate type heat exchanger, it is most preferable that the channels running between the plates have meso scale dimensions. While not specifically shown, both heat exchangers are insulated, so that little thermal energy is lost.

Figure 5:
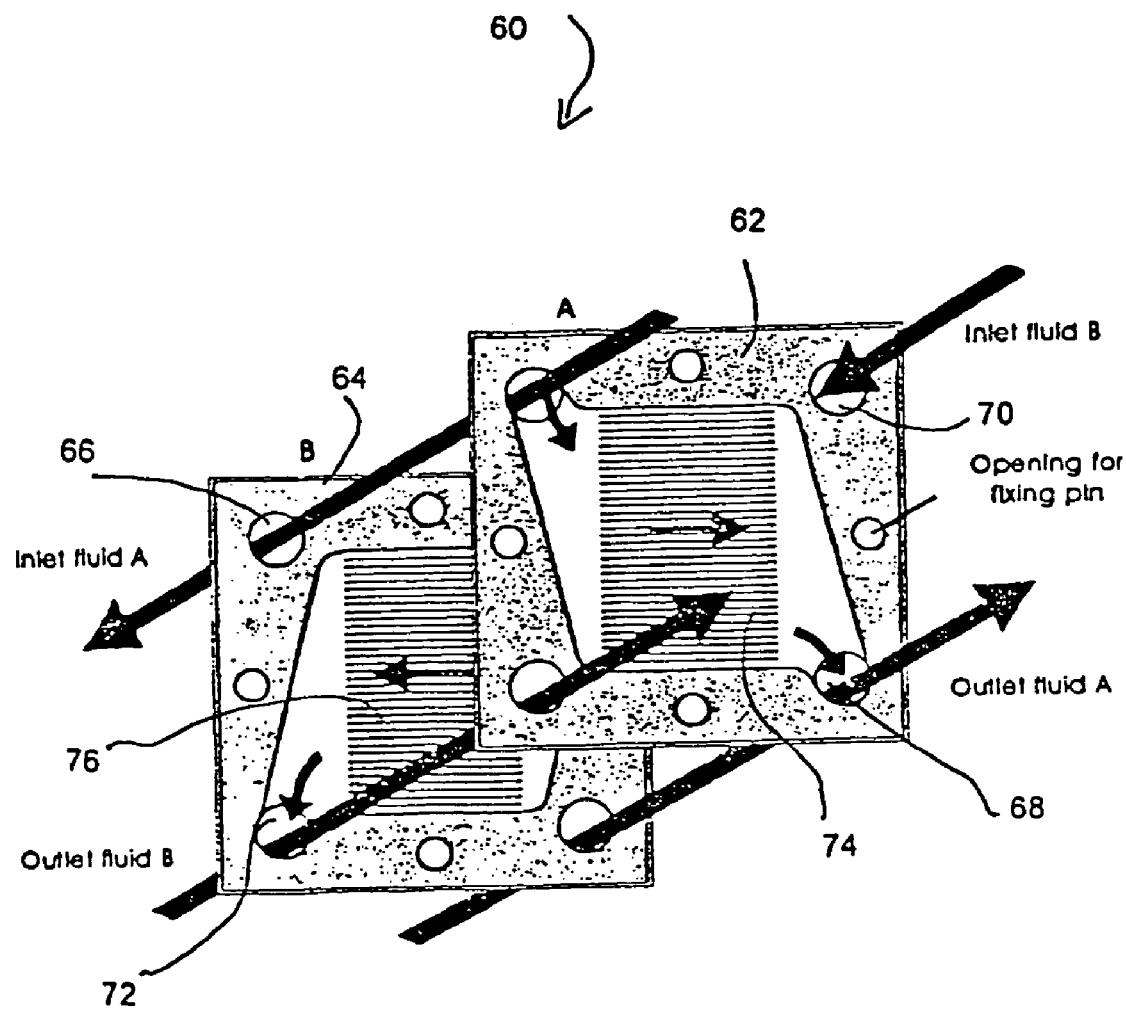
FIG. 5 is an exploded isometric view of heat exchanger for use in one embodiment of the hydrogen reactor in accordance with the present invention.

FIG. 5 is an exploded isometric view of a stacked plate-type mesochannel heat exchanger 60 for use in the present invention. The heat exchanger includes a first plate 62 and a second plate 64 encased in a housing (not shown). Aligned through each plate are a first fluid, inlet, e.g., a fuel inlet or an oxygen inlet, 66, a first fluid outlet 68, a second fluid inlet, e.g., a combustion by-product or a reaction product inlet, 70, and a second fluid outlet 72. The first fluid flows in through the first fluid inlet, than flows through a plurality of mesochannels 74 formed on the surface of the side of the first plate opposite the second plate, and then out through the first fluid outlet. The second fluid flows in through the second fluid inlet, then flows in direction opposite to the direction of flow of the first fluid, through a plurality of mesochannels 76 formed on the surface of the side of the second plate adjacent the first plate, and then out through the second fluid outlet through.

In one embodiment, such heat exchangers are produced from 25 micron stainless steel foils, which axe bonded using electroplating. Ceramic heat exchangers of a similar design can also be employed. Such mesochannel heat exchangers have up to 97% efficiency, while at the same time being relatively light-weight. The pressure drop is extremely low—approximately 2" of water column.

In those embodiments, where expediency in switching from ammonia to hydrocarbon fuels (and vice versa) is desired, the fuel tank 12 and the heat exchangers 26 and 28 are fabricated so that they are compatible with both ammonia and hydrocarbon fuels. In alternative embodiments, where it is desired to minimize the cost of the components, different fuel tanks and heat exchangers are used for different fuels. For example, not all seal materials are compatible with both ammonia and hydrocarbons. Some, generally more expensive seal materials are compatible with both. Furthermore, since ammonia and the water produced by combustion of ammonia form a corrosive mixture, corrosion resistant materials should be used, instead of stainless steel. Furthermore, it is preferable for such components to be able to be reused. That is, some materials may be chemically compatible with the fuel for only a short period of time. The hydrogen generator preferably is a reusable system, and thus the fuel supply and the fuel heat exchanger are preferably adapted to be used with the fuel for extended cycles. Therefore, rather than employing expensive materials for all such components, it may be beneficial to fabricate different heat exchangers and different fuel supplies specifically adapted to be compatible with a selected fuel (ammonia or hydrocarbon).

The hydrogen generator 10 also includes an air injector pump 78 disposed in the oxygen supply line 22 between the oxygen heat exchanger 30 and the hydrogen membrane reactor and in the tail gas supply line 23. The injector pump conveys both the tail gas exiting the reaction chamber and the air from the oxygen supply into the combustion chamber of hydrogen membrane reactor 12.

Preferably, the hydrogen generator 10 will generate hydrogen on demand and in those embodiments where the hydrogen is to be used immediately after it is generated the hydrogen reservoir 18 is not required. However, there are inefficiencies inherent in a hydrogen generating cycle that comprises a series of short periods of operation followed by long periods of inactivity, because during the start up phase, the fuel is being used to bring the system up to an operating temperature rather than for generating hydrogen. Therefore, in some embodiments, the hydrogen reservoir is employed to store hydrogen not currently required, so that while the system is at operating temperature, the fuel can be employed to generate hydrogen for later use, rather than to bring the system to operating temperature.

As shown in FIG. 1, in those embodiments employing ammonia as a fuel and where the hydrogen gas is to be used to power an H/AFC, it is preferred to include an ammonia adsorbent supply 80 in fluid connection with the reaction product line 26. H/AFCs can be adversely affected by even trace amounts of ammonia, so the adsorbent is capable of removing any residual ammonia contained within the hydrogen exiting hydrogen membrane reactor 12. Under ideal conditions, a properly designed and functioning hydrogen membrane reactor will not allow any ammonia to pass through the membrane. However, microscopic manufacturing defects, post manufacture punctures, or poor sealing along the edges of a hydrogen membrane can enable a small amount of ammonia to contaminate the hydrogen stream.

In embodiments where the hydrogen is used for purposes that are not as sensitive to residual ammonia, such as welding or metal treating, the absorbent supply may not be necessary. Similarly, if manufacturing defects, punctures, and sealing deficiencies are uncommon, then ammonia adsorbent supply will not be required.

The adsorbent within the adsorbent supply 56 should remove substantially all (leaving less than 1 ppm) of the residual ammonia from the hydrogen product. Preferred adsorbents include carbon and modified carbon adsorbents. Most preferred adsorbents include carbon whose surface has been impregnated to include bound acid molecules. The acid thus bound neutralizes the residual ammonia. At a minimum, the most preferred adsorbent has 2 millimoles of strong acid adsorption sites per gram of carbon, and the most preferred adsorbent can have up to 5 millimoles per gram of carbon.

For embodiments in which the fuel cell 31 is added to the system to generate electricity from the hydrogen produced, the preferred fuel cell is a PEM fuel cell. Embodiments that incorporate a battery 82 are also contemplated. Such systems can provide useful power even when no oxygen is available. Normally, oxygen is required by the hydrogen generator 10 to react with the fuel in the hydrogen membrane reactor 12. Oxygen is also needed as a fuel for the reaction that occurs in the fuel cell 31. However, in some embodiments, the system first can be operated in an aerobic environment for a period of time sufficient to generate sufficient hydrogen for the fuel cell to produce enough electricity to bring the battery to a substantially charged state. Then the system can be placed in an anaerobic environment (such as underwater) and still be capable of supplying electrical power from the battery for a period of time. Note that the incorporation of batteries increases the system size and weight, and somewhat decreases the energy density of the system; accordingly, this embodiment is most beneficially employed when anaerobic conditions are anticipated. Preferably, such a system will be prepared for use with a fully charged battery and a full fuel supply 14, so that fuel from the fuel supply does not need to be used to initially charge the battery.

Turning now to the operation of the hydrogen generator 10, the system has both start up and steady state operational modes. The start up mode is the period in which fuel is burned to bring the reactor 12, and more specifically, the reaction catalyst, up to the required reaction temperature. During this start up period, little or no hydrogen is generated. The steady state mode of operation represents the time after the reactor has reached operating temperature, and the fuel is being primarily converted to hydrogen. In preferred embodiments, during the steady state mode, thermal energy is generated by combusting the by-products that are separated from the hydrogen using the hydrogen membrane. The by-products, or tail gas, are combined with air and burned, to extract the maximum thermal energy from the fuel.

Figure 6:
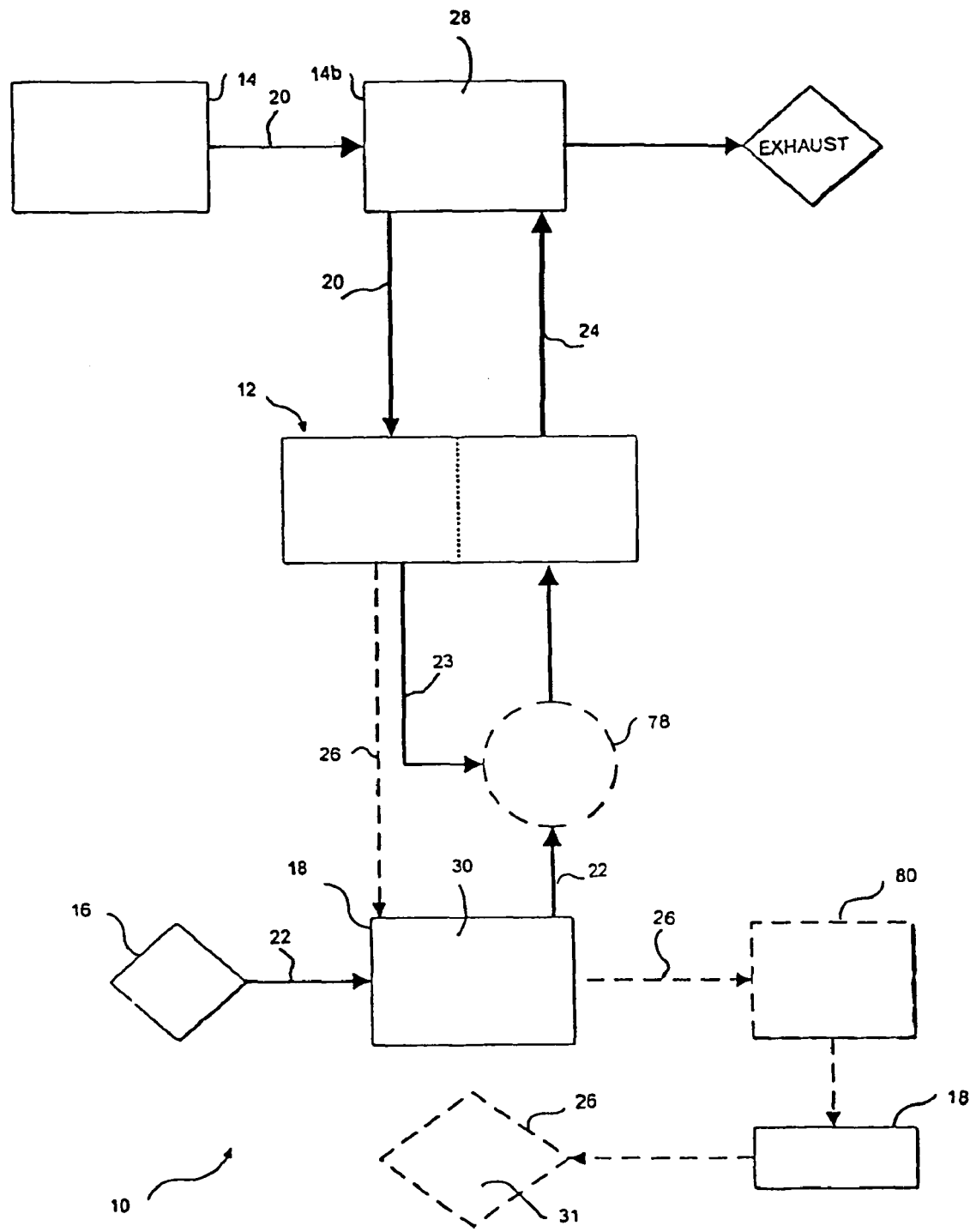
FIG. 6 is a block diagram corresponding to the hydrogen membrane reactor of FIG. 1, showing the system during a start up sequence.

FIG. 6 shows fluid flows for the hydrogen generator 10 in the start up phase. Referring specifically to an embodiment where liquefied ammonia is the fuel, liquefied ammonia exits fuel tank 14 and flows through fuel supply line 20 into fuel heat exchanger 28. At start up, the fuel heat exchanger is cold, so no preheating of the ammonia occurs. However, the liquefied ammonia substantially volatilizes at room temperature without preheating, and so ammonia vapor flows through the fuel supply line into the reaction chamber (not separately shown) of the hydrogen membrane reactor 12. Because the reactor is cold (room or ambient temperature verses a preferred operating temperature of 650° C.) no disassociation occurs, and the "tail gas" exiting the reaction chamber through the tail gas supply line 23 is ammonia. That ammonia is then fed into the combustion chamber (not separately shown), along with ambient air transported through the oxygen supply line 22 from the oxygen supply 16. At this time, the oxygen heat exchanger 30 is also at ambient temperature, so that no preheating of air introduced into the combustion chamber occurs.

In the combustion chamber of hydrogen membrane reactor 12, the ammonia and air, in the presence of the combustion catalyst, are ignited. As the reactor initially heats up, combustion by products exiting the reactor through combustion by-product line 24 cause the fuel heat exchanger 28 to begin to heat up as well. The heat, in turn, causes the ammonia traveling through fuel supply line 20 to be preheated, further adding thermal energy to the reactor. The start up phase continues until the catalyst is heated up to its own light off temperature. At that point, the ammonia disassociation reaction is enabled, and the system enters a steady state.

Figure 7:
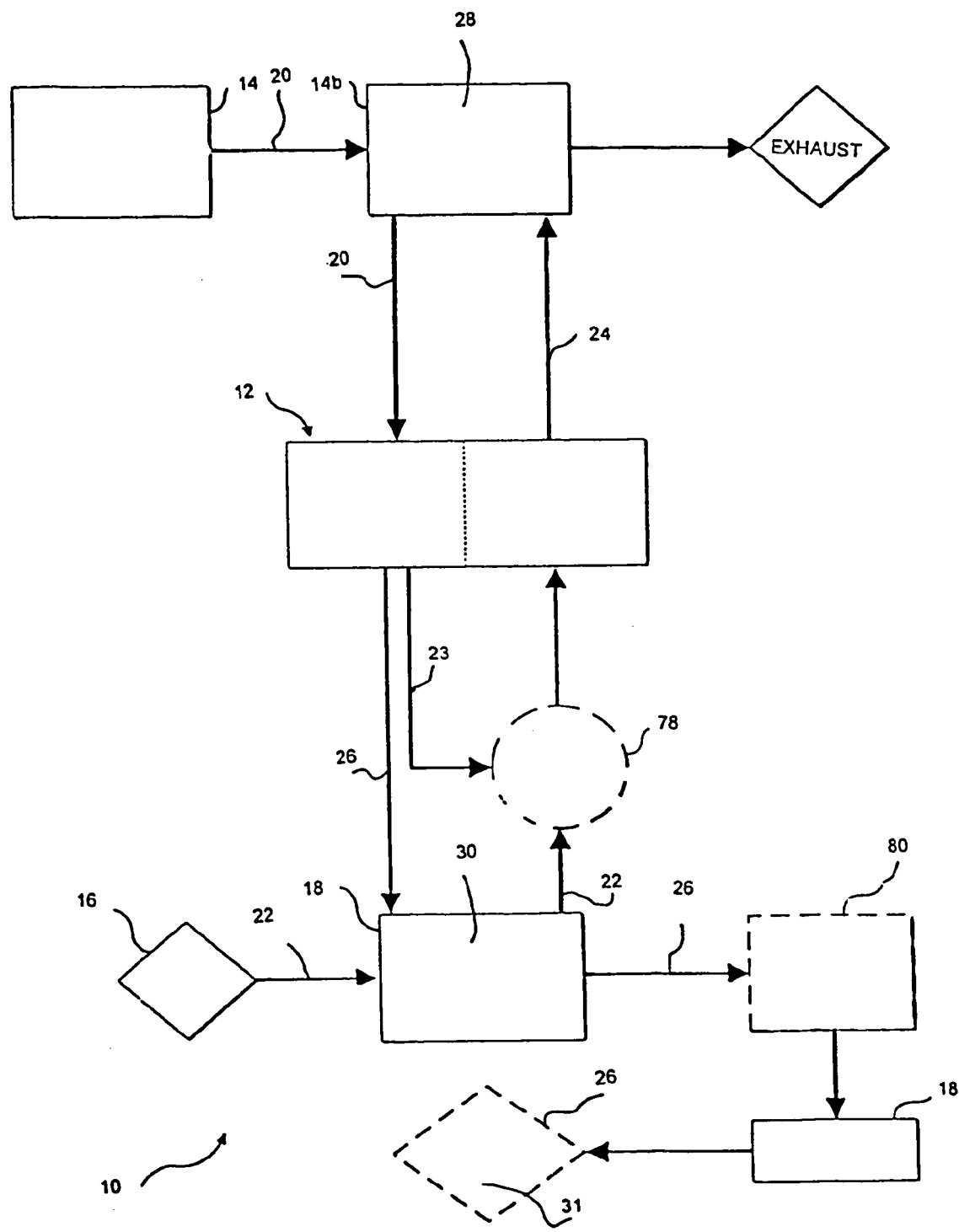
FIG. 7 is a block diagram corresponding to the hydrogen membrane reactor of FIG. 1, showing the system during a steady state sequence.

In the steady state, as illustrated in FIG. 7, ammonia entering the reaction zone of the reaction chamber (not separately shown) though fuel supply line 20 disassociates into hydrogen and nitrogen as illustrated by Equation 1. The majority of the hydrogen passes through the hydrogen membrane (not shown) and travels through the hydrogen exhaust channels (not separately shown) out of the membrane reactor through reaction product line 26. The hydrogen membrane allows hydrogen to diffuse across the membrane, eliminating the need for a further separation step to obtain a relatively pure hydrogen stream. Besides separating the desired hydrogen stream from other reaction products, the hydrogen membrane favorably affects the kinetics of the hydrogen generation reaction. By continually removing hydrogen from the reaction zone, the membrane causes an imbalance in the reaction kinetics that drives the conversion of more fuel into hydrogen in response to this imbalance. This conversion further increases the efficiency of the process, as without such a driving force, additional thermal energy would be required to drive the hydrogen generation reaction.

The hot hydrogen passes through the hydrogen membrane, into the hydrogen exhaust zone and then out of the hydrogen membrane reactor 12 through the reaction product line 26. The hot hydrogen enters oxygen heat exchanger 30 and is cooled by the ambient air transported through the oxygen supply line 22, which in turn is preheated before entering hydrogen the hydrogen membrane reactor. The tail gas now includes primarily nitrogen with traces of unreacted ammonia and traces of hydrogen that did not pass through the hydrogen membrane. The tail gas has some fuel value (due to the traces of ammonia and hydrogen) and enters the combustion chamber of hydrogen membrane reactor, where combustion of the tail gas provides sufficient thermal energy to maintain the required thermal conditions in hydrogen membrane reactor for self-sustaining disassociation and combustion reactions to occur, so long as the ammonia from ammonia storage tank 14 is provided.

Figure 8:
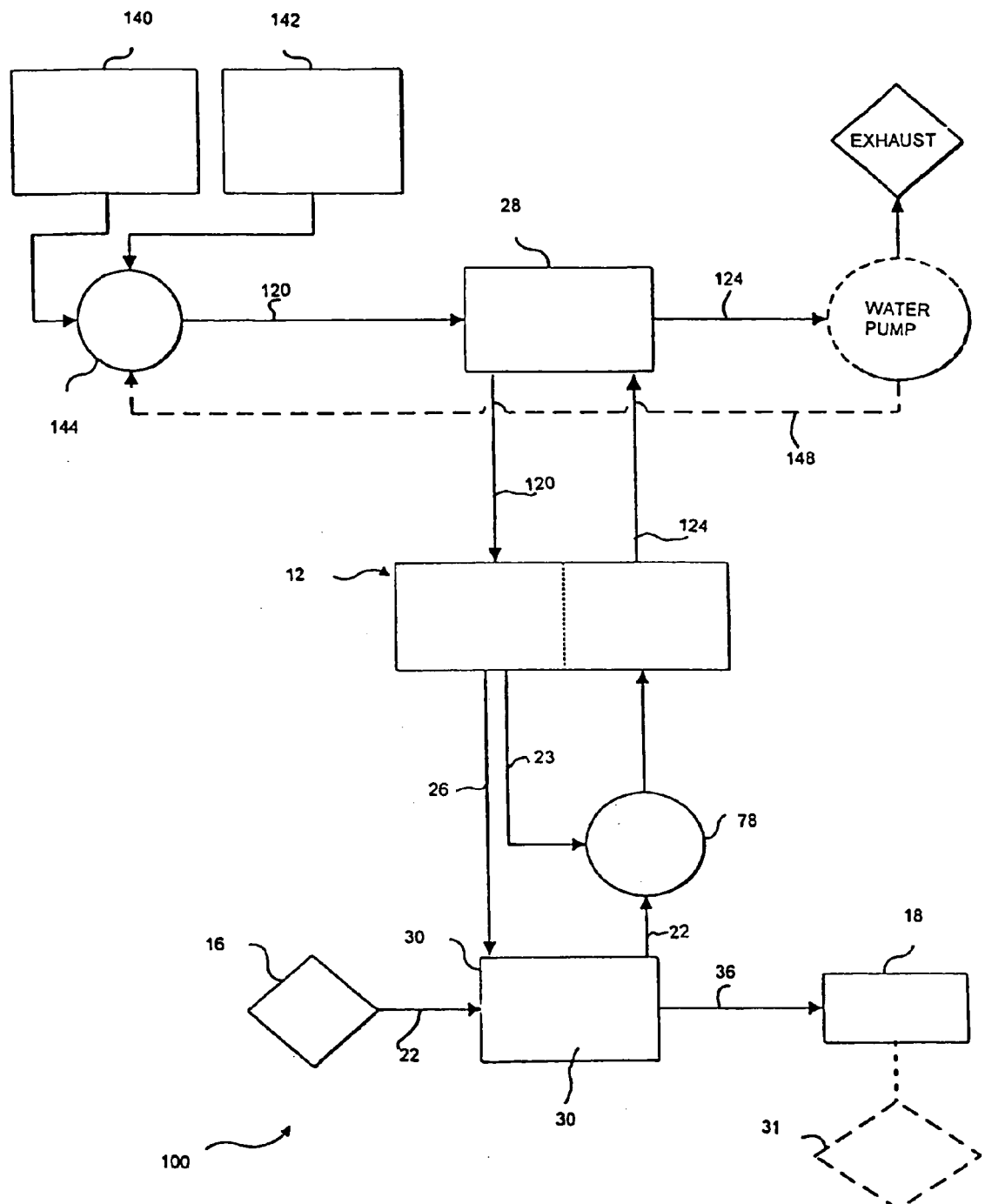
FIG. 8 is a block diagram illustrating the primary components of an alternative hydrogen generator in accordance with the present invention.

FIG. 8 illustrates fluid flows for an alternative hydrocarbon generator 100 based on a hydrocarbon steam reformation reaction. In this embodiment, the hydrogen produced is used to power a fuel cell (or for other purposes as described above) while the CO is combusted to provide thermal energy to sustain the steam reforming reaction.

The hydrogen generator 100 shares many features with the hydrogen generator 10 and similar elements are identified with similar numbers. The difference is that hydrogen generator 100 also incorporates a water supply system to provide steam for the steam reforming reaction. The water supply system includes a hydrocarbon fuel tank 140, a water storage tank 142, and a hydrocarbon/water pump 144. If a pressurized hydrocarbon (such as natural gas or propane) is employed as the fuel, the pressure alone would be enough to drive the fuel through the hydrogen generator. However, if a liquid hydrocarbon, such as JP-8 is employed, the pump will be required. Regardless, the pump provides a motive force to drive water from the water storage tank though fluid supply line 120 into the hydrogen membrane reactor 12. A fuel heat exchanger 28 operably connected to the fuel supply line and a combustion by-product line 24 is included to transform the water into steam and to preheat the hydrocarbon fuel.

Hydrogen generator 100 includes a hydrogen membrane reactor 12 having two separate chambers (not shown), a reaction chamber in a heat exchange relationship with a combustion chamber. In a preferred embodiment, the reaction chambers each incorporate mesoscale channels to enhance the reaction efficiencies.

The reaction chamber incorporates a steam reforming catalyst, while the combustion chamber incorporates a catalyst to facilitate the combustion of the selected hydrocarbon fuel. Catalysts for steam reforming of hydrocarbons and combustion of hydrocarbons are readily available from a variety of sources. For example, the catalyst division of Johnson Matthey, in Wayne, Pa., provides suitable catalysts. The reaction catalysts have characteristic "light-off" temperatures, as well as a characteristic optimal temperature. These temperature parameters affect a specific reactor design by defining minimum and optimum reactor temperatures. In a preferred embodiment, the desired reactor temperature will be less than 650° C., so that conventional metals (rather than high temperature refractory metals) can be used to fabricate the hydrogen membrane reactor. In one embodiment, the catalysts are incorporated as packed beds, while in another embodiment the catalysts are deposited on surfaces of the reaction chamber and the combustion chamber.

In some embodiments, the hydrogen generator includes a water recovery system, to reduce the amount of water required. This feature is particularly advantageous if a small and compact system is required. Such a water. recovery system is in fluid communication with the pump 144, and includes a recovered water return line 148 that is in fluid communication with the fuel heat exchanger 28, such that the water fraction from the cooled combustion products exiting the fuel heat exchanger is recycled through the recovered water reservoir 148, while other combustion products are simply exhausted.

Figure 9:
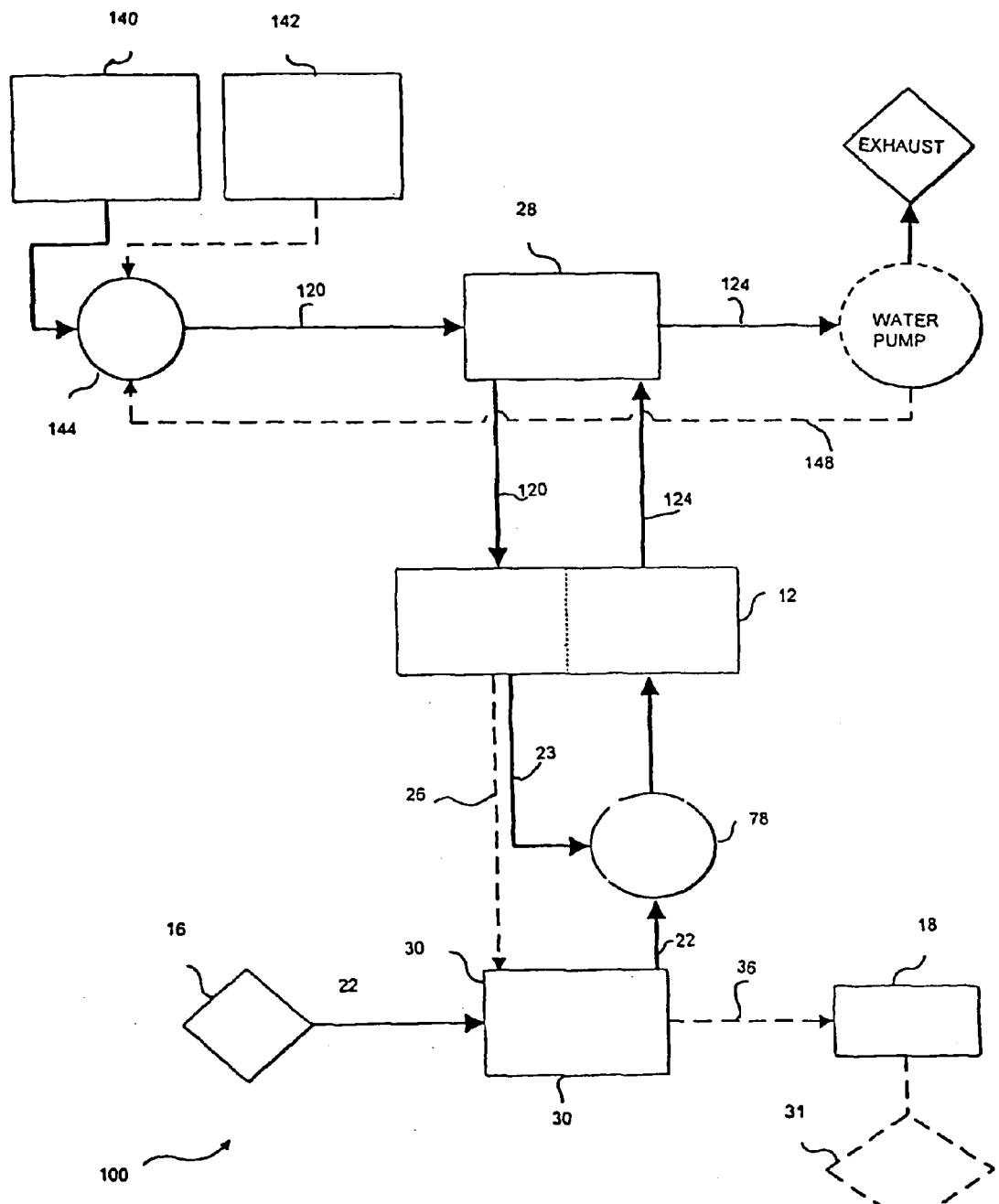
FIG. 9 is a block diagram corresponding to the hydrogen membrane reactor of FIG. 8, showing the system during a start up sequence.

FIG. 9 shows fluid flows for the hydrogen generator 100 in a start up phase. The hydrocarbon fuel from hydrocarbon storage tank 140 is transported through the fuel supply line 120 (using the fuel pump 144 if a non-pressurized fuel is employed) into the fuel heat exchanger 28. Because the fuel heat exchanger is cold at startup, steam generation and hydrocarbon preheating cannot occur, so that water for steam generation is not required. Also, because hydrogen membrane reactor 12 is cold (ambient temperature versus 650° C.) no steam is yet required for steam reformation.

The hydrocarbon first enters the reaction chamber. At start up, no steam reformation can occur, and the "tail gas" exiting the reaction chamber though tail gas supply line 23 will be pure hydrocarbon. That hydrocarbon is then fed through the tail gas supply line into the combustion chamber, along with ambient air transported through oxygen supply line 24 from oxygen supply 16. At this time, the oxygen heat exchanger 30 is also at ambient temperature, so that preheating of the air introduced into the hydrogen membrane reactor 12 does not yet occur.

In the combustion reaction chamber of hydrogen membrane reactor 12, the hydrocarbon and air, in the presence of the combustion catalyst, are ignited. As the reactor initially heats up, combustion products exiting the reactor cause the fuel heat exchanger 28 to begin to heat up as well, which causes the hydrocarbon fuel from storage tank 140 to be preheated, further adding thermal energy to the reactor. The start up phase continues until the reaction catalyst is heated to its light off temperature. At that point, water is released from storage tank 142. If pump 144 is not yet on, it is now energized. The oxygen heat exchanger 30, now hot due to the heat of the combustion products exiting the combustion chamber, transforms the water to steam. The steam reformation reaction is now enabled, and the system enters a steady state.

Figure 10:
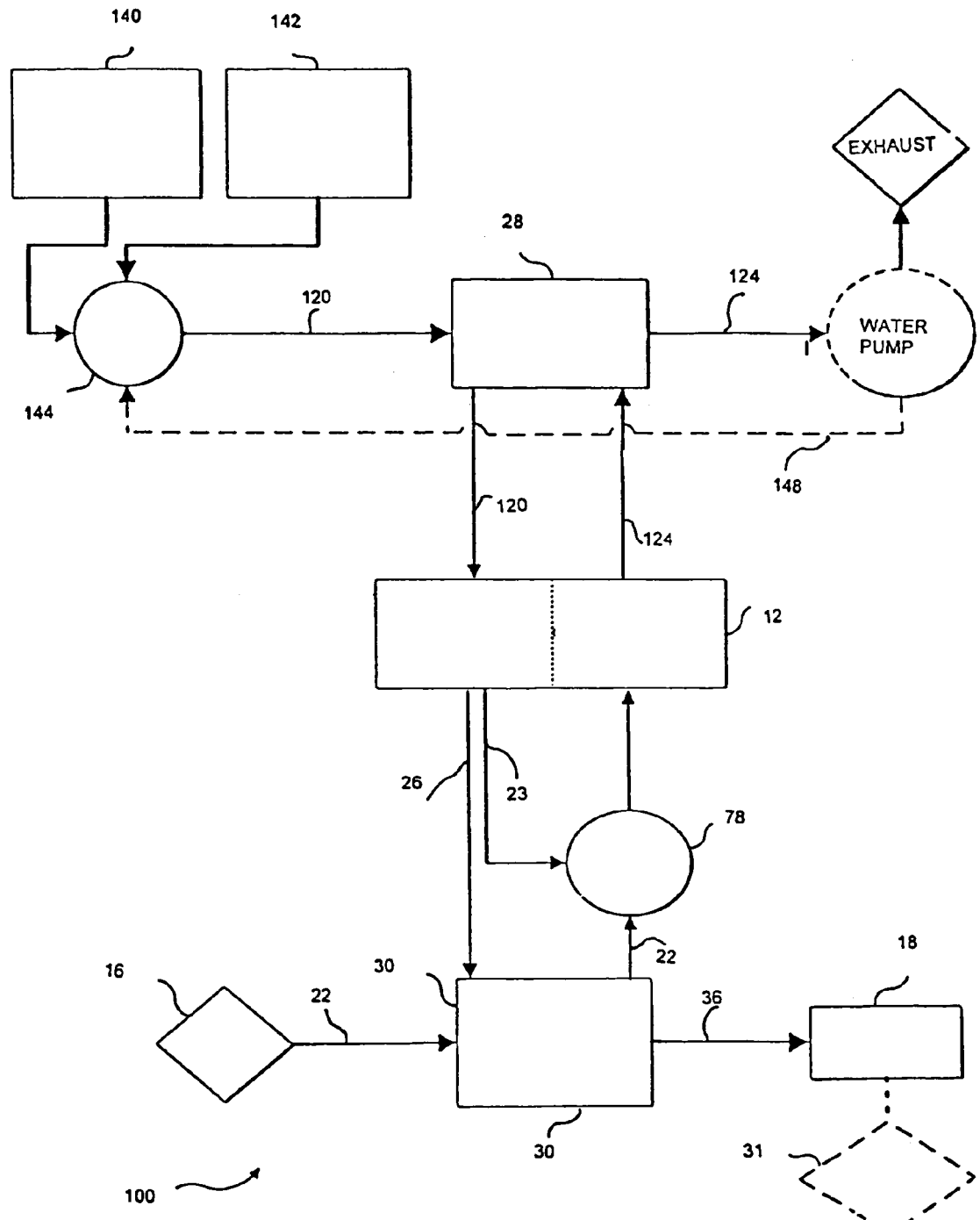
FIG. 10 is a block diagram corresponding to the hydrogen membrane reactor of FIG. 8, showing the system during a steady state sequence.

In the steady state, as illustrated in FIG. 10, steam and hydrocarbons entering the reaction are reformed into hydrogen and carbon monoxide. The majority of the hydrogen exits the reaction zone by passing through the hydrogen membrane, into the hydrogen exhaust zone, and then out of the hydrogen membrane reactor through the reaction product line 26. This hot hydrogen enters oxygen heat exchanger 30 and is cooled by ambient air, which in turn is preheated before entering the combustion chamber. The tail gas now includes primarily carbon monoxide with traces of unreformed hydrocarbons, and traces of hydrogen that did not pass through the hydrogen membrane and has significant fuel value. The tail gas enters the combustion chamber, where combustion of the tail gas provides sufficient thermal energy to maintain the required thermal conditions in the hydrogen membrane reactor for self sustaining steam reformation and combustion reactions to occur, as long as hydrocarbon fuel and steam are provided.

In a preferred embodiment, a hydrogen generating system in accordance with the present invention will include real-time, automated, and low power process control elements, including gas sensor technology, to provide an automated system that requires minimal user interaction. Miniature real-time gas sensors and miniature flow control valves can be incorporated into compact systems. Preferably, a programmable microprocessor is used to digitize sensor inputs and actuate flow control components. To minimize power consumption, such process control elements require low power. Lightweight components for pressure and temperature measurements are commercially available. Preferably, the only composition sensor required by the process control system is an oxygen sensor, which is commercially readily available, having been developed for the automotive industry.

In some embodiments, the hydrogen generator is designed to operate in a submerged environment for short periods, with an energy density of 2000 watt hours/kg. The performance requirements for such embodiments are based on a three-day period, requiring a total energy of approximately 1500 watt hours. The total hydrogen generator weight is less than 1 kg (about 720 g). Further, the hydrogen generator provides a 20 watt average power output level. Peak sustainable output is about 30 watts. To meet these energy requirements, the hydrogen generator is designed to produce a total of approximately 75 grams of hydrogen.

Table I shows the weight of fuel required by such designs, given the conversion efficiency provided.

TABLE I

Fuel Weight Requirements for Three-Day Period

| Fuel | Est. Efficiency of Hydrogen Generator | Mass of Fuel |
| --- | --- | --- |
| Ammonia | 95% | 499 |
| JP-8 | 80% | 245 |

Figure 11:
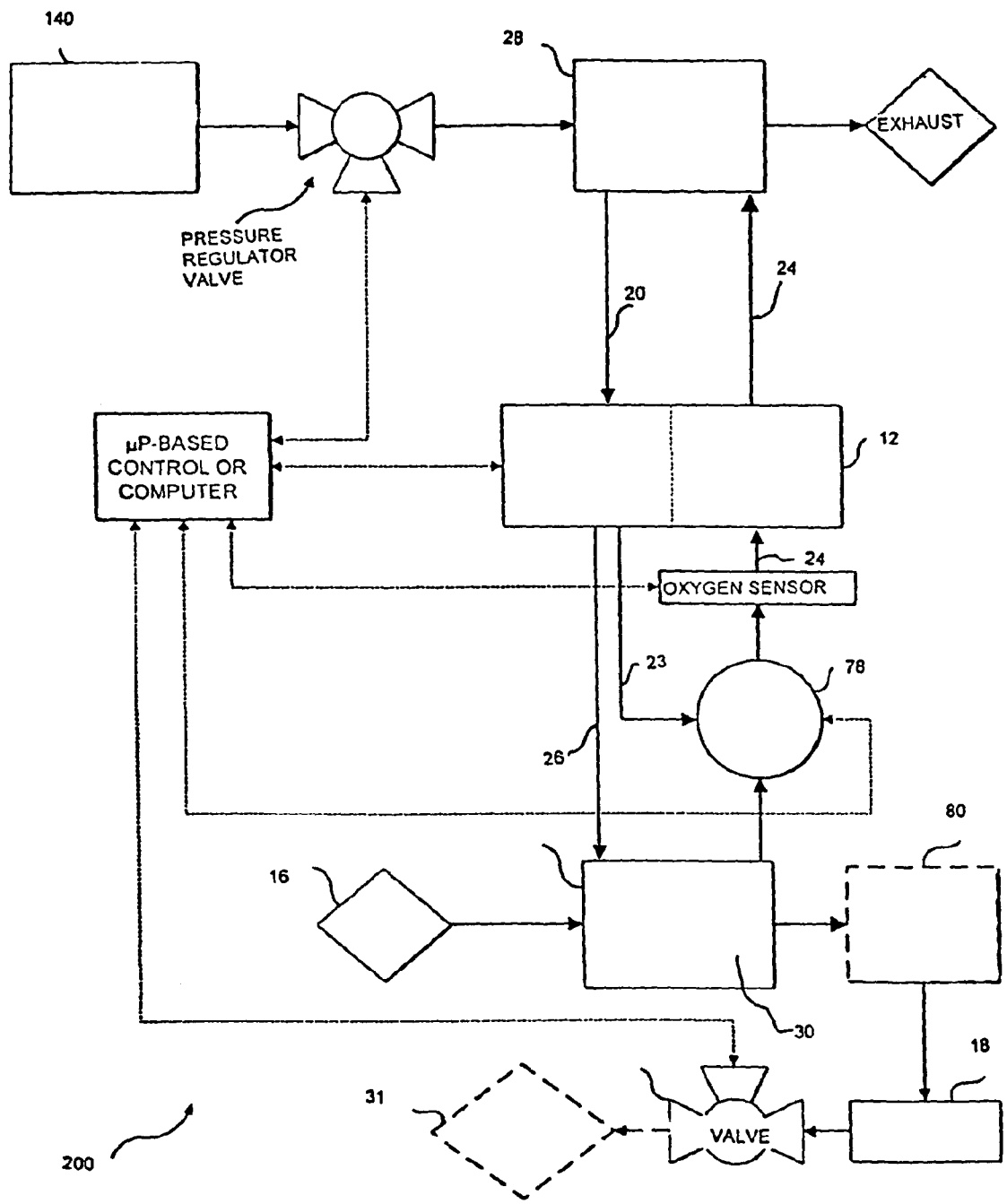
FIG. 11 is a block diagram illustrating the primary components of a second alternative hydrogen generator in accordance with the present invention.

FIG. 11 illustrates an ammonia-decomposition-based hydrogen generator 200 designed to produce 82 grams of hydrogen at a maximum production rate of 300 sccm, and a minimum production rate of 30 sccm. It is an advantage of the hydrogen generator that there are no rotating parts, such as fans, blowers or pumps. The absence of such components reduces noise, reduces parasitic power consumption, and increases reliability.

Based on a complete analysis, accounting for chemical equilibrium, mass balances, energy balances and assumed heat exchanger efficiencies of 95%, mass flow rates are indicated that correspond to a hydrogen production rate of 235 sccm. This hydrogen generation rate is required to produce 20 watts of electric power, the desired average output for this system.

Table II reports the mass flow rates, compositions, temperatures, and pressures are presented at each point in the process identified in FIG. 11.

TABLE II

Process Parameters at Steady State and Full Hydrogen Output

| Process Point | Pressure (psia) | Temperature (C.) | Composition (mole fraction) | Mass Flow (g/h) |
|---|---|---|---|---|
| 1 | 60 | 25 | $NH_3 = 1.0$ | 7.2 |
| 2 | 60 | 577 | $NH_3 = 1.0$ | 7.2 |
| 3 | 15 | 600 | $H_2 = 1.0$ | 1.09 |
| 4 | 15 | 66 | $H_2 = 1.0$ | 1.09 |
| 5 | 14.7 | 25 | $N_2 = 0.79/O_2 = 0.21$ | 6.2 |
| 6 | 14.7 | 571 | $N_2 = 0.79/O_2 = 0.21$ | 6.2 |
| 7 | 60 | 600 | $N_2 = 0.69/H_2 = 0.30/NH_3 < 0.01$ | 6.2 |
| 8 | 15 | 594 | $N_2 = 0.74/O_2 = 0.1/H_2 = 0.16$ | 12.4 |
| 9 | 15 | 600 | $N_2 = 0.8/O_2 = 0.02/H_2O = 0.18$ | 13.1 |
| 10 | 14.7 | 350 | $N_2 = 0.8/O_2 = 0.02/H_2O = 0.18$ | 13.1 |

Table III reports the size and weight of the various components.

TABLE III

Size and Mass Estimates for Key Components

| Component | Size (cm³) | Mass (g) |
|---|---|---|
| Reactor | 2 × 2 × 8 = 32 | 40 |
| Ammonia thermal exchanger | 1 × 2 × 8 = 16 | 20 |
| Air thermal exchanger | 1 × 2 × 8 = 16 | 16 |
| Packaging, plumbing and controls | 40 | 50 |

Figure 12:
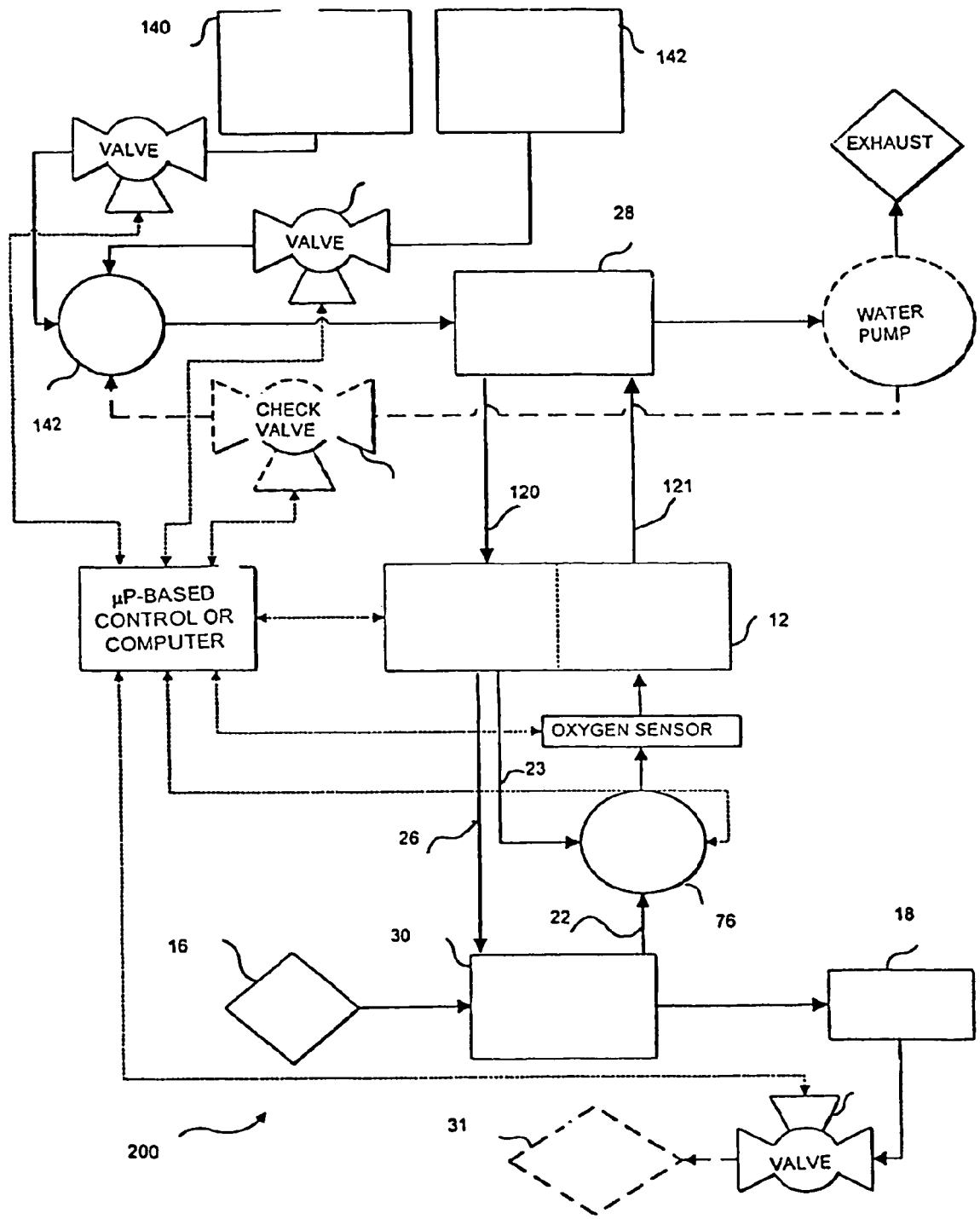
FIG. 12 is a block diagram illustrating the primary components of a third alternative hydrogen generator in accordance with the present invention.

FIG. 12 illustrates a hydrocarbon steam reformation-based hydrogen generator 300. The generator is designed to produce 80 grams of hydrogen at a maximum production rate of 200 sccm. The only moving parts are the liquid fuel and water pumps. The absence of blowers reduces noise, reduces parasitic power consumption, and increases reliability.

Based on a complete analysis, accounting for chemical equilibrium, mass balances, energy balances and assumed heat exchanger efficiencies of 96%, mass flow rates are indicated that correspond to a hydrogen production rate of 200 sccm.

Table IV reports the mass flow rates, compositions, temperatures and pressures are represented at each point in the process identified in FIG. 12.

TABLE IV

Process Parameters at Steady State with Hydrogen Output for 20 Watts Power

| Process Point | Pressure (psia) | Temperature (C.) | Composition (mole fraction) | Mass Flow (g/h) |
|---|---|---|---|---|
| 1 | 14.7 | 25 | $HC = 1.0$ | 3.33 |
| 2 | 60 | 25 | $HC = .04/H_2O = .96$ | 11.9 |
| 3 | 60 | 600 | $HC = .04/H_2O = .96$ | 11.9 |
| 4 | 15 | 600 | $H_2 = 1.0$ | 1.09 |
| 5 | 15 | 25 | $H_2 = 1.0$ | 1.09 |
| 6 | 14.7 | 580 | $N_2 = 0.79/O_2 = 0.21$ | 12.3 |
| 7 | 14.7 | 600 | $N_2 = 0.79/O_2 = 0.21$ | 12.3 |
| 8 | 60 | 600 | $CO_2 = .38/CO = .19/H_2O = .19/H_2 = .24$ | 10.8 |
| 9 | 15 | 580 | $CO_2 = .19/CO = .09/H_2O = .21/$ | 23.9 |

TABLE IV-continued

Process Parameters at Steady State with Hydrogen Output for 20 Watts Power

| Process Point | Pressure (psia) | Temperature (C.) | Composition (mole fraction) | Mass Flow (g/h) |
|---|---|---|---|---|
| 10 | 14.7 | 600 | $H_2 = .12/N_2 = .40$ $N_2 = .80/CO_2 = .28/H_2O = .32$ | 24.9 |
| 11 | 14.7 | 70 | $N_2 = .57/CO_2 = .40/H_2O = .03$ | 20.3 |
| 12 | 14.7 | 70 | $H_2O = 1.0$ | 4.64 |

Table V reports the size and weight of the various components.

TABLE V

Size and Mass Estimates for Key Components

| Component | Size (cm³) | Mass (g) |
|---|---|---|
| Reactor | 2 × 4 × 8 = 64 | 60 |
| Fuel/water thermal exchanger | 1 × 4 × 8 = 32 | 30 |
| Air thermal exchanger | 1 × 4 × 8 = 32 | 30 |
| Packaging, plumbing and controls | 60 | 200 |

Although the present invention has been described in connection with the preferred form of practicing it, those of ordinary skill in the art will understand that many modifications can be made thereto without departing from the spirit of the present invention. Accordingly, it is not intended that the scope of the invention in any way be limited by the above invention.

We claim:

1. A hydrogen generator comprising:
    a hydrogen membrane reactor having a combustion chamber in a fluid connection with and in a heat exchange relationship with a reaction chamber, wherein the hydrogen membrane reactor comprises a top plate, a bottom plate, and a separation plate having first and second opposing surfaces, the top plate and the first surface of the separation plate together defining the reaction chamber, the bottom plate and the second surface of the separation plate together defining the combustion chamber, a hydrogen separation membrane having first and second opposing surfaces disposed between the top plate and the separation plate, the top plate and the first surface of the hydrogen separation membrane together defining a hydrogen exhaust zone and the separation plate and the second surface of the hydrogen separation membrane together defining a reaction zone;
    the combustion chamber comprises a plurality of combustion channels extending from the surface of the separation plate, the combustion channels creating a fluid path through the combustion chamber;
    the hydrogen exhaust zone comprises a plurality of hydrogen exhaust channels extending from the first surface of the hydrogen membrane, creating a fluid path through the hydrogen exhaust zone; and
    the reaction zone comprises a plurality of reaction channels extending from the second surface of the hydrogen membrane, creating a fluid path through the reaction zone;
    a fuel supply;
    a fuel supply line for transporting fuel from the fuel supply to the reaction chamber;
    an oxygen supply;

an oxygen supply line for transporting oxygen from the oxygen supply to the combustion chamber;
a tail gas supply line for transporting tail gases from the reaction chamber;
a combustion by-product line for transporting combustion by-products from the combustion chamber; and
a reaction product line for transporting hydrogen from the reaction chamber; and
wherein the tail gas supply line makes a fluid connection between the reaction chamber and the combustion chamber.

2. A hydrogen generator in accordance with claim 1 wherein the height and width of each of the combustion channels, the hydrogen exhaust channels, and the reaction channels is between 0.01 mm and 10 mm.

3. A hydrogen generator in accordance with claim 1 wherein the height and width of each of the combustion channels, the hydrogen exhaust channels, and the reaction channels is between 0.5 mm and 5 mm.

4. A hydrogen generator in accordance with claim 1 wherein the tail gas supply line makes a fluid connection between the reaction zone and the oxygen supply line.

5. A hydrogen generator in accordance with claim 1 further comprising a fuel heat exchanger operably connected to the fuel supply line and one of the combustion by-product line or the reaction product line.

6. A hydrogen generator in accordance with claim 5 wherein the fuel heat exchanger is a stacked-plate-type heat exchanger having channels with a height and a width between about 0.01 mm and 10 mm running between the stacked plates.

7. A hydrogen generator in accordance with claim 1 further comprising an oxygen heat exchanger operably connected to the oxygen supply line and one of a combustion by-product line or a reaction product supply line.

8. A hydrogen generator in accordance with claim 7 wherein the oxygen heat exchanger is a stacked-plate-type heat exchanger having channels with a height and a width between about 0.01 mm and 10 mm running between the stacked plates.

9. A hydrogen generator in accordance with claim 1 further comprising a fuel heat exchanger operably connected to the fuel supply line and the combustion by-product line and an oxygen heat exchanger operably connected to the oxygen supply line and a reaction product supply line.

10. A hydrogen generator in accordance with claim 1 further comprising a hydrogen reservoir in fluid connection with the reaction product supply line.

11. A hydrogen generator in accordance with claim 1 further comprising a hydrogen fuel cell in fluid connection with a reaction product supply line.

12. A hydrogen generator in accordance with claim 1 wherein the fuel supply is an ammonia supply.

13. A hydrogen generator in accordance with claim 1 further comprising a combustion catalyst in the combustion chamber.

14. A hydrogen generator in accordance with claim 1 further comprising a combustion catalyst packed in or coated on an internal surface of the combustion channels.

15. A hydrogen generator in accordance with claim 1 further comprising a reaction catalyst in the reaction chamber.

16. A hydrogen generator in accordance with claim 1 further comprising a reaction catalyst packed in or coated on the internal surfaces of the reaction channels.

17. A hydrogen generator in accordance with claim 13 further comprising an ammonia adsorbent supply in fluid communication with the reaction product line.

18. A hydrogen generator in accordance with claim 1 wherein the fuel supply is a hydrocarbon supply.

19. A hydrogen generator in accordance with claim 18 wherein the hydrocarbon supply is methanol, propane, butane, or kerosene supply.

20. A hydrogen membrane reactor comprising a top plate, a bottom plate, and a separation plate having first and second opposing surfaces, the top plate and the first surface of the separation plate together defining the reaction chamber, the bottom plate and the second surface of the separation plate together defining the combustion chamber, the combustion chamber having a plurality of combustion channels extending radially from the surface of the separation plate, the combustion channels creating a fluid path through the combustion chamber, a hydrogen separation membrane having first and second opposing surfaces disposed between the top plate and the separation plate, the top plate and the first surface of the hydrogen separation membrane together defining a hydrogen exhaust zone, the hydrogen exhaust zone having a plurality of hydrogen exhaust channels extending radially from the first surface of the hydrogen membrane, the hydrogen exhaust channels creating a fluid path through the hydrogen exhaust zone, and the separation plate and the second surface of the hydrogen separation membrane together defining a reaction zone; the reaction zone having a plurality of reaction channels extending radially from the second surface of the hydrogen membrane, the reaction channels creating a fluid path through the reaction zone; a fuel inlet into the reaction zone;
an oxygen inlet into the combustion chamber,
a tail gas outlet out of the reaction zone;
a hydrogen outlet out of the hydrogen exhaust zone; and
a by-product outlet out of the combustion chamber
wherein the tail gas outlet makes a fluid connection between the reaction chamber and the combustion chamber.

21. A hydrogen membrane reactor in accordance with claim 20 wherein the height and width of each of the combustion channels, the hydrogen exhaust channels, and the reaction channels is between 0.01 mm and 10 mm.

22. A hydrogen membrane reactor in accordance with claim 20 wherein the height and width of each of the combustion channels, the hydrogen exhaust channels, and the reaction channels is between 0.5 mm and 5 mm.

23. A hydrogen membrane reactor in accordance with claim 21 further comprising a combustion catalyst packed in or coated on the internal surfaces of the combustion channels.

24. A hydrogen membrane reactor in accordance with claim 21 further comprising a reaction catalyst packed in or coated on the internal surfaces of the reaction channels.

25. A hydrogen generator comprising:
a hydrogen membrane reactor including a combustion chamber having an inlet and an outlet in a heat exchange relationship with a reaction chamber having an inlet and an outlet;
wherein the hydrogen membrane reactor comprises a top plate, a bottom plate, and a separation plate having first and second opposing surfaces, the top plate and the first surface of the separation plate together defining the reaction chamber, the bottom plate and the second surface of the separation plate together defining the combustion chamber, a hydrogen separation membrane having first and second opposing surfaces disposed between the top plate and the separation plate, the top plate and the first surface of the hydrogen separation membrane together defining a hydrogen exhaust zone and the separation plate and the second surface of the hydrogen separation membrane together defining a reaction zone;

the combustion chamber comprises a plurality of combustion channels extending from the surface of the separation plate, the combustion channels creating a fluid path through the combustion chamber;

the reaction zone comprises a plurality of reaction channels extending from the second surface of the hydrogen membrane, creating a fluid path through the reaction zone;

a fuel supply;

a fuel supply line fluidly connecting the fuel supply to the reaction chamber inlet, an oxygen supply;

an oxygen supply line fluidly connecting the oxygen supply to the combustion chamber inlet;

a tail gas supply line making a fluid connection between the reaction chamber outlet and the combustion chamber inlet;

a combustion by-product line making a fluid connection with the combustion chamber for transporting combustion by-product from the combustion chamber; and a reaction product line for transporting hydrogen from the reaction chamber.

* * * * *